United States Patent
Lin et al.

(10) Patent No.: US 11,595,177 B2
(45) Date of Patent: Feb. 28, 2023

(54) TONE CLASSIFICATION FOR PHYSICAL CHANNELS WITH MULTIPLEXED DATA

(71) Applicant: QUALCOMM Incorporated, San Diego, CA (US)

(72) Inventors: Ming Ta Lin, San Jose, CA (US); Afshin Haftbaradaran, San Diego, CA (US); Shravan Kumar Reddy Garlapati, San Diego, CA (US); Cunzhen Liu, San Diego, CA (US); Alessandro Risso, San Diego, CA (US); Li Zhang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 111 days.

(21) Appl. No.: 17/084,621

(22) Filed: Oct. 29, 2020

(65) Prior Publication Data

US 2022/0140976 A1    May 5, 2022

(51) Int. Cl.
*H04L 5/00*    (2006.01)

(52) U.S. Cl.
CPC .......... *H04L 5/0053* (2013.01); *H04L 5/0007* (2013.01); *H04L 5/0044* (2013.01); *H04L 5/0048* (2013.01)

(58) Field of Classification Search
CPC ...... H04L 5/0055; H04L 5/0053; H04L 5/007
USPC ........................................... 370/329
See application file for complete search history.

(56) References Cited

U.S. PATENT DOCUMENTS

| | | | |
|---|---|---|---|
| 2008/0014861 A1* | 1/2008 | Li | H04L 5/0051 455/3.06 |
| 2009/0022098 A1* | 1/2009 | Novak | H04L 1/1867 370/329 |

* cited by examiner

*Primary Examiner* — Angel T Brockman
(74) *Attorney, Agent, or Firm* — Holland & Hart LLP

(57) ABSTRACT

Methods, systems, and devices for wireless communications are described. A shared channel may include a set of tones carrying multiple types of control information multiplexed together. A wireless device may perform a tone classification method to determine individual subsets of tones from the set of tones for each type of control information to extract each type of control information. The wireless device may determine multiple subsets of tones correspond to multiple types of control information simultaneously based on different extraction parameters. For example, the wireless device may determine a total number of tones in a set of tones, a distance between any given two tones in the set of tones, an offset value, or any combination thereof for the extraction parameters. The wireless device may then use these extraction parameters to determine or extract two or more subsets of tones for two or more corresponding types of control information.

30 Claims, 15 Drawing Sheets

TONE CLASSIFICATION FOR PHYSICAL CHANNELS WITH MULTIPLEXED DATA

TECHNICAL FIELD

The following relates to wireless communications, including tone classification for physical channels with multiplexed data.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipments (UEs). In some cases, a first wireless device (for example, a UE) may multiplex different types of information into a single message (that is, combine different types of information in one message) as part of transmitting one or more messages to a second wireless device (for example, a second UE, a base station, or an additional type of wireless device). Efficient techniques are desired for extracting the different types of information multiplexed in a single message.

SUMMARY

The described techniques relate to improved methods, systems, devices, and apparatuses that support tone classification for physical channels with multiplexed data. Generally, the described techniques provide for a first wireless device to receive a shared channel message from a second wireless device, the shared channel message including multiple types of control information multiplexed in the shared channel message. Additionally, the shared channel message may include a set of tones that contain the multiple types of control information. In some implementations, the first wireless device may determine one or more extraction parameters for extracting two or more types of control information of the multiple types of control information from the set of tones. For example, the one or more extraction parameters may include one or more of a total number of tones in the set of tones, a distance between each tone in the set of tones, or an offset value, among other examples. Subsequently, the first wireless device may use at least some of these one or more extraction parameters to determine that a first subset of tones of the set of tones corresponds to a first type of control information and that a second subset of tones of the set of tones corresponds to a second type of control information (for example, the first wireless device may determine a number of subsets of tones corresponding to respective types of control information, for example, a number great than two).

In some implementations, after determining that the first subset of tones corresponds to the first type of control information and that the second subset of tones corresponds to the second type of control information, the first wireless device may receive the first type of control information and the second type of control information based on extracting the corresponding subsets of tones. The first wireless device may then update the one or more extraction parameters for the set of tones based on the first subset of tones and the second subset of tones being extracted. Subsequently, the first wireless device may determine one or more additional subsets of tones of the set of tones correspond to one or more additional types of control information using the updated one or more extraction parameters and may receive these one or more additional types of control information.

One innovative aspect of the subject matter described in this disclosure can be implemented in a method for wireless communication at a first wireless device. The method may include receiving, from a second wireless device, a shared channel message, the shared channel message including a set of tones carrying control information of a set of multiple types multiplexed in the set of tones, determining one or more extraction parameters for each type of the set of multiple types of control information, determining a first subset of tones of the set of tones carries first control information of a first type of the set of multiple types of control information and a second subset of tones of the set of tones carries second control information of a second type of the set of multiple types of control information based on respective extraction parameters of the one or more extraction parameters, the determining of the first subset of tones at least partially overlapping in time with the determining of the second subset of tones, and receiving the first control information and the second control information based on the determining of the first subset of tones and the second subset of tones.

Another innovative aspect of the subject matter described in this disclosure can be implemented in an apparatus for wireless communications at a first wireless device. The apparatus may include a processor, memory in electronic communication with the processor, and instructions stored in the memory. The instructions may be executable by the processor to cause the apparatus to receive, from a second wireless device, a shared channel message, the shared channel message including a set of tones carrying control information of a set of multiple types multiplexed in the set of tones, determine one or more extraction parameters for each type of the set of multiple types of control information, determine a first subset of tones of the set of tones carries first control information of a first type of the set of multiple types of control information and a second subset of tones of the set of tones carries second control information of a second type of the set of multiple types of control information based on respective extraction parameters of the one or more extraction parameters, the determining of the first subset of tones at least partially overlapping in time with the determining of the second subset of tones, and receive the first control information and the second control information based on the determining of the first subset of tones and the second subset of tones.

Another innovative aspect of the subject matter described in this disclosure can be implemented in another apparatus for wireless communications at a first wireless device. The apparatus may include means for receiving, from a second wireless device, a shared channel message, the shared channel message including a set of tones carrying control information of a set of multiple types multiplexed in the set of tones, means for determining one or more extraction parameters for each type of the set of multiple types of control information, means for determining a first subset of tones of the set of tones carries first control information of a first type of the set of multiple types of control information and a second subset of tones of the set of tones carries second control information of a second type of the set of multiple types of control information based on respective extraction parameters of the one or more extraction parameters, the determining of the first subset of tones at least partially overlapping in time with the determining of the second subset of tones, and means for receiving the first control information and the second control information based on the determining of the first subset of tones and the second subset of tones.

Another innovative aspect of the subject matter described in this disclosure can be implemented in a non-transitory computer-readable medium storing code for wireless communications at a first wireless device. The code may include instructions executable by a processor to receive, from a second wireless device, a shared channel message, the shared channel message including a set of tones carrying control information of a set of multiple types multiplexed in the set of tones, determine one or more extraction parameters for each type of the set of multiple types of control information, determine a first subset of tones of the set of tones carries first control information of a first type of the set of multiple types of control information and a second subset of tones of the set of tones carries second control information of a second type of the set of multiple types of control information based on respective extraction parameters of the one or more extraction parameters, the determining of the first subset of tones at least partially overlapping in time with the determining of the second subset of tones, and receive the first control information and the second control information based on the determining of the first subset of tones and the second subset of tones.

Some examples of the method, apparatuses, and non-transitory computer-readable medium described herein may further include operations, features, means, or instructions for updating respective extraction parameters of the one or more extraction parameters based on determining the first subset of tones carries the first control information and the second subset of tones carries the second control information, determining a third subset of tones of the set of tones carries third control information of a third type of the set of multiple types of control information based on the updated one or more extraction parameters, and receiving the third control information based on the determining of the third subset of tones.

Some examples of the method, apparatuses, and non-transitory computer-readable medium described herein may further include operations, features, means, or instructions for determining a subset of tones of the set of tones carries a reference signal before determining the first subset of tones carries the first control information and the second subset of tones carries the second control information.

Some examples of the method, apparatuses, and non-transitory computer-readable medium described herein may further include operations, features, means, or instructions for determining the first subset of tones carries the first control information and the second subset of tones carries the second control information may be based on a tone classification throughput associated with the first wireless device, the tone classification throughput including a number of types of control information determined in a single operation.

In some examples of the method, apparatuses, and non-transitory computer-readable medium described herein, the one or more extraction parameters include one or more of a total number of tones in the set of tones, a distance between each tone in the set of tones, or an offset value.

In some examples of the method, apparatuses, and non-transitory computer-readable medium described herein, the set of multiple the types of control information includes one or more of reference signals, acknowledgement feedback, channel state information part one, channel state information part two, or scheduled data.

DETAILED DESCRIPTION

Figure 1:
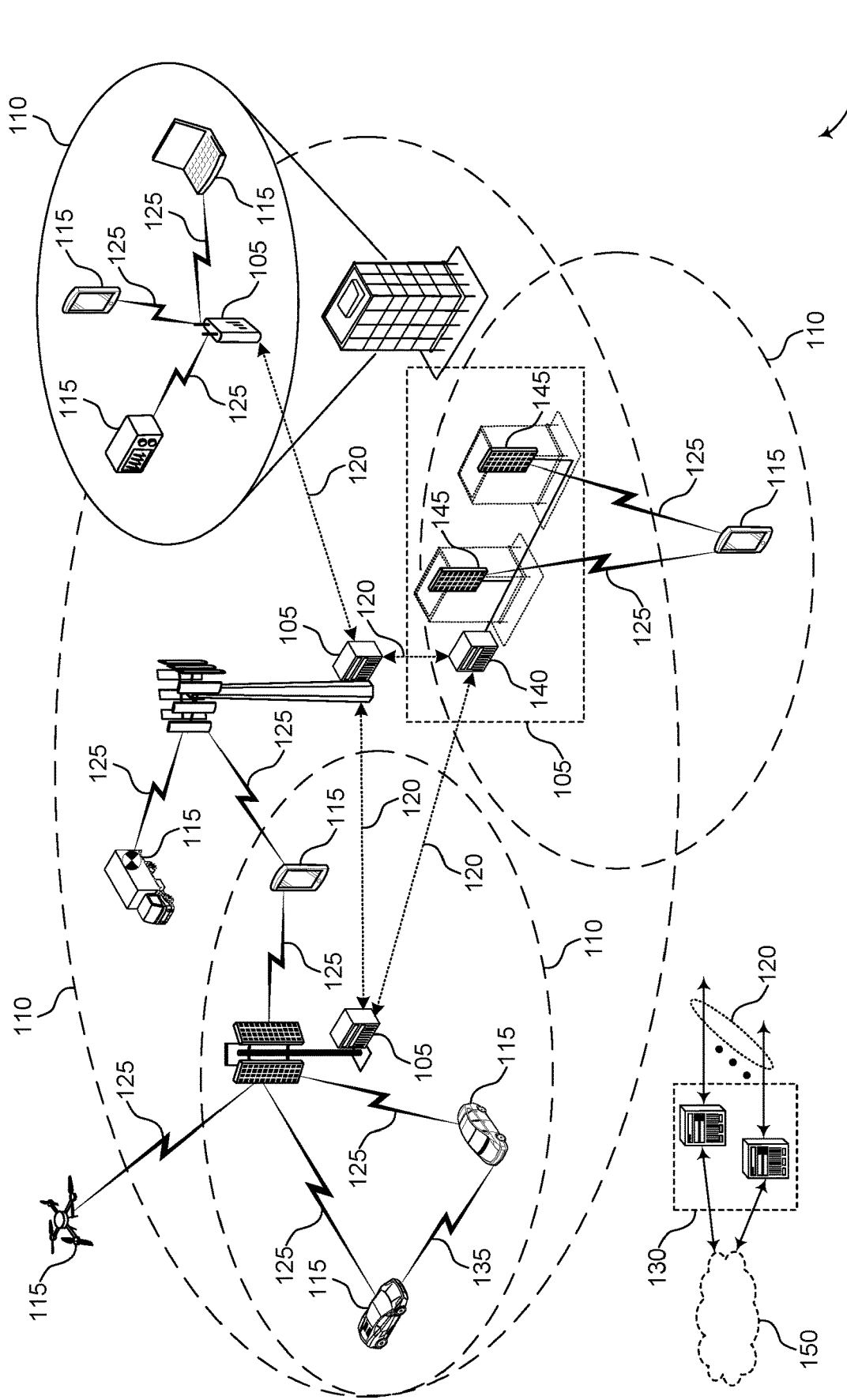
FIG. 1 illustrates an example of a wireless communications system that supports tone classification for physical channels with multiplexed data in accordance with aspects of the present disclosure.

A shared channel may include a set of tones carrying multiple types of control information multiplexed together. A wireless device may perform a method, for example a classification method, to determine individual subsets of tones from the set of tones for each type of control information to extract each type of control information. In some cases, the wireless device may map one subset of tones for a corresponding type of control information at a time. As such, by mapping one subset of tones at a time, computational time and latency for decoding the entire shared channel may increase with the number of tones carrying the multiple types of control information.

Various aspects generally relate to a tone classification method, and more specifically, to determining extraction parameters that enable a more efficient extraction of tones for corresponding types of control information from a single shared channel message. For example, to reduce the computational time and latency to decode a shared channel transmission, a wireless device may determine (for example, classify) multiple subsets of tones corresponding to multiple types of control information simultaneously (for example, at least partially overlapping) based on different extraction parameters. For example, the wireless device may determine a total number of tones in a set of tones, a distance between any given two tones in the set of tones, an offset value, other information, or any combination thereof for the extraction parameters. The wireless device may then use these extraction parameters to determine or extract multiple (for example, two or more) subsets of tones for multiple (for example, two or more) corresponding types of control information. In some implementations, the wireless device may then update the extraction parameters based on the determined or extracted subsets of tones and may proceed to determine or extract one or more additional subsets of tones for corresponding types of control information until each type of control information is determined or extracted. These techniques may be used for physical uplink shared channels (PUSCHs) with multiplexed uplink control information (UCI) as well as for physical sidelink shared channels (PSSCHs) with multiplexed sidelink control information (SCI), among other examples.

Particular aspects of the subject matter described in this disclosure may be implemented to realize one or more of the following potential advantages. The techniques employed by the described communication devices may provide benefits and enhancements to the operation of the communication devices, including more efficient tone classification or tone extraction from a set of multiplexed tones carrying multiple types of control information. For example, operations performed by the described communication devices may enable the communication devices to determine or extract two or more subsets of tones to receive corresponding types of control information, thereby reducing latency and computational time in comparison to determining or extracting a single subset of tones for a corresponding single type of control information at a time. Additionally, the techniques employed by the described communications devices may enable the communications devices to support a tone classification method dynamically (for example, on the fly) without having to store information (for example, tone maps) in memory, which may result in a more efficient use of the memory storage for the communication devices along with decreasing latency, among other advantages.

Aspects of the disclosure are initially described in the context of wireless communications systems. Additionally, aspects of the disclosure are illustrated through an additional wireless communications system, a tone classification, a tone mapping procedure, a tone mapping, and a process flow. Aspects of the disclosure are further illustrated by and described with reference to apparatus diagrams, system diagrams, and flowcharts that relate to tone classification for physical channels with multiplexed data.

FIG. 1 illustrates an example of a wireless communications system 100 that supports tone classification for physical channels with multiplexed data in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element (RE) may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, in which a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode if not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

In some cases, if a wireless device receives a shared channel transmission that includes multiplexed control information (for example, a base station 105 receiving a PUSCH with multiplexed UCI), the wireless device may demultiplex the shared channel transmission based on a tone allocation and then may decode code blocks (CBs) individually. The tone allocation may include a tone or RE mapping between different types of control information. For example, the different types of control information may include three types of UCI, such as HARQ acknowledgment (ACK) feedback, channel state information (CSI) part 1, CSI part 2 types, and uplink scheduled (UL-SCH) data on a PUSCH transport block (TB). Depending on a number of HARQ-ACK information bits, the wireless device may perform a mapping process in a variable number of steps (for example, four or five steps), in which each step maps one tone type (that is, a type of control information) through the entire TB with the TB including all tones or REs of all OFDM symbols available for a PUSCH. In some cases, the CSI part 1 may be used to determine a number of information bits in the CSI part 2, introducing a dependency that the wireless device tone maps, extracts, and decodes the CSI part 1 before tone mapping, extracting, and decoding the CSI part 2 and the UL-SCH data.

In some cases, if demultiplexing different types of control information from a shared channel transmission, the wireless device may use a tone mapping method to compute the tone allocations and may store the tone allocations as a look up table (for example, with the look up table having a size of 137592 bit/TB based on 14 symbols per TB*3276 tones per symbol*3 bits per tone) to support a maximum bandwidth. However, although tone map computation, tone extraction, and CB decoding are performed in pipeline stages to reduce latency using this tone mapping method, a dependency between the CSI part 1 and the CSI part 2 may create a pipeline bubble such that the CSI part 2 tone map computation is visible to an overall latency. Additionally, a computation time for the tone mapping may be proportional to a total amount of tones available to a PUSCH (that is, a bandwidth available for the PUSCH).

In some cases, a limitation in processing power of hardware for the wireless device (for example, for a UE modem supporting base station operations) may further impact latency or constrain a modem from supporting control information (for example, UCI) multiplexed on a shared channel transmission (such as a PUSCH) at high bandwidth (for example, UCI may be supported on a physical uplink control channel (PUCCH) alone). Additionally, this tone mapping method may further limit an ability of the wireless device to obtain multiple tone maps if supporting MU-MIMO based on reference signals for the shared channel transmission belonging to different multiplexing groups. For example, a PUSCH demodulation reference signal (DMRS) or a phase-tracking reference signal (PTRS) for users may belong to different DMRS code division multiplexing (CDM) groups or different PTRS groups that are mapped to different tone allocations, which may affect UCI and scheduled (SCH) tone allocations.

Turning to the present disclosure, wireless communications system 100 may support a tone classification method for a wireless device that enables the wireless device to determine or extract multiple subsets of tones from a set of tones to decode and receive corresponding different types of control information while the tone classification is ongoing (for example, on the fly). By determining and extracting multiple subsets of tones to decode and receive corresponding different types of control information, this described tone classification method may enable the wireless device to break the dependency of different types of control information (for example, the CSI part 1 indicating information bits for the CSI part 2 and the UL-SCH data). Additionally, this described tone classification method may enable the wireless device to extract the different subsets of tones without storing tone allocations for each type of control information in memory based on performing the tone classification on the fly.

Figure 2:
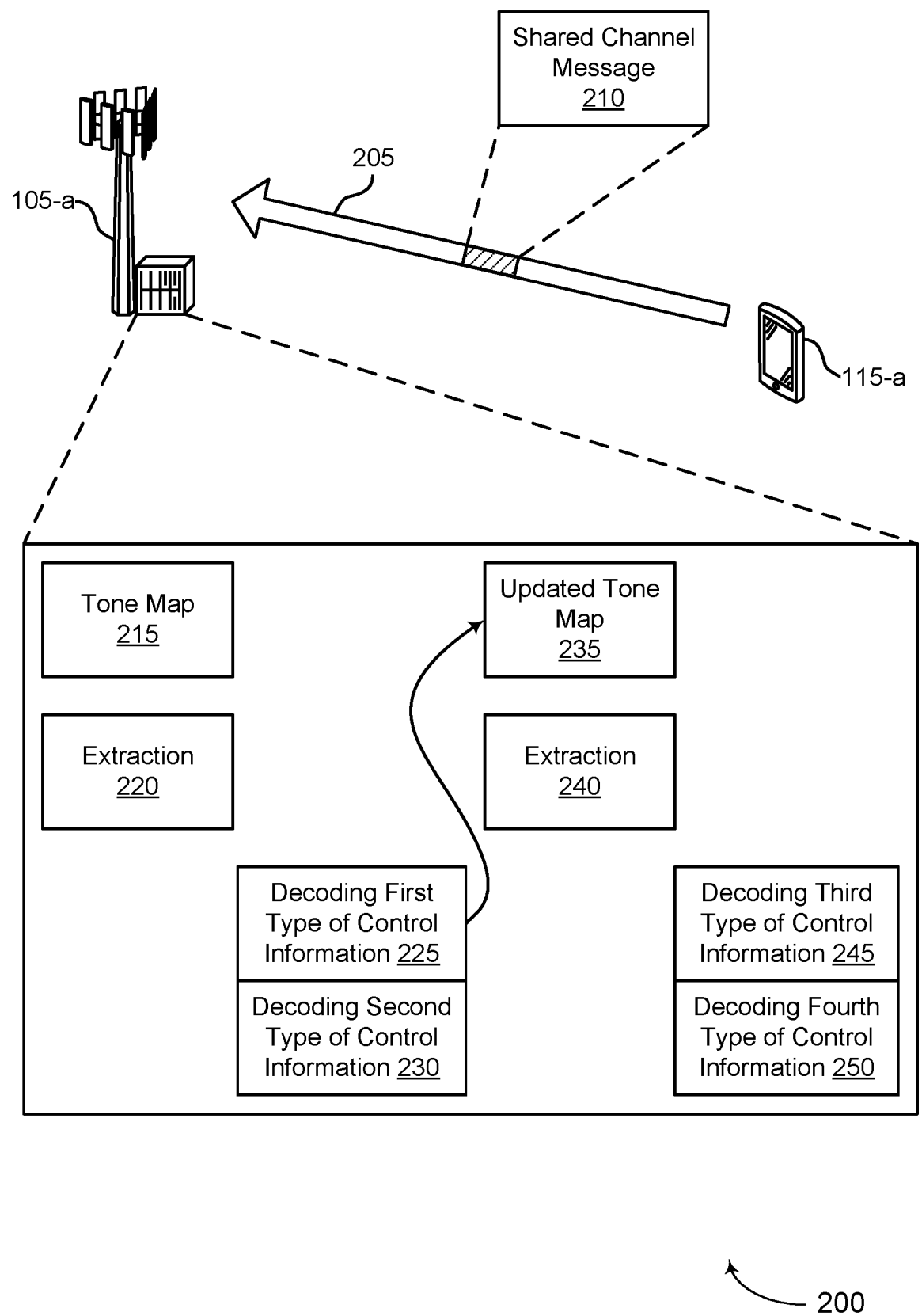
FIG. 2 illustrates an example of a wireless communications system that supports tone classification for physical channels with multiplexed data in accordance with aspects of the present disclosure.

FIG. 2 illustrates an example of a wireless communications system 200 that supports tone classification for physical channels with multiplexed data in accordance with aspects of the present disclosure. In some example, the wireless communications system 200 may be implemented by or may implement aspects of the wireless communications system 100. For example, the wireless communications system 200 may include a base station 105-*a* (for example, a first wireless device) and a UE 115-*a* (for example, a second wireless device), which may represent examples of corresponding base stations 105 and UEs 115, respectively, as described with reference to FIG. 1. Additionally, the UE 115-*a* may transmit messages to the base station 105-*a* on resources of a carrier 205. For example, the UE 115-*a* may transmit a shared channel message 210 (for example, a PUSCH) to the base station 105-*a* on the carrier 205. In some examples, the UE 115-*a* may multiplex different types of control information in the shared channel message 210, and the base station 105-*a* may use a tone classification method to extract each of the different types of control information from the shared channel message 210.

This tone classification method may include two steps. A first step may include the base station 105-*a* calculating a number of tones (N) in the shared channel message 210 and a distance between two given tones (D) in the shared channel message 210 (for example, N and D may represent extraction parameters). In some examples, the base station 105-*a* may determine N and D per symbol (or a different length TTI) for each type of control information in the shared channel message 210 (for example, different extraction types). Additionally, the base station 105-*a* may perform the calculations or determinations of N and D per symbol for each type of control information in firmware, a general-purpose processor, or a different component of the base station 105-*a*. In some example, calculating or determining the N and D parameters per symbol may enable a component, such as a modem, of the base station 105-*a* to pause extraction of the different types of control information in the shared channel message 210 (for example, PUSCH extraction) at symbol boundary (or a similar boundary for a different length TTTI) to perform other high priority tasks and resume the extraction later.

The second step of this tone classification method may include the base station 105-*a* performing the tone classification dynamically, such as at-speed on the fly (for example, as the tone classification is ongoing such that no tone allocations are stored in memory). With performing the tone classification on the fly, the base station 105-*a* may classify multiple subset of tones in cascaded stages to corresponding types of control information, and each stage may be identical and correspond to one tone type. Additionally, performing the tone classification on the fly may breaks a dependency from tone types of previously classified or extracted tones, which may allow hardware implementations of the base station 105-*a* to run at high clock rate (or run efficiently on a digital signal processor (DSP) without nested loops). In some example, a dependency that the tone allocation for a third type of control information (for example, CSI part 2) and for SCH data may still depend on a content in a second type of control information (for example, CSI part 1), but by performing the tone classification in the cascaded steps, the base station 105-*a* may determine the tone allocation for the third type of control information and for the SCH data while also extracting or classifying the third type of control information, the SCH data, or both. In some examples, a processing time may be independent of the number of tones for this at-speed on the fly tone classification.

For example, for this tone classification method (for example, a PUSCH extract and decode sequence with on-the-fly tone classification), the base station 105-*a* may first determine a tone map 215 based on the calculating or determining the N and D parameters for each type of control information. While the tone map 215 is being determined, the base station 105-*a* may also begin an extraction 220 to start extracting respective subsets of tones that correspond to different types of control information (for example, classifying the subsets of tones into the corresponding types of control information or determining the subsets of tones for the corresponding types of control information). Subsequently, based on performing the tone classification on the fly, the base station 105-*a* may then decode a first type of control information 225 (for example, HARQ-ACK feedback or reserved ACK bits) and a second type of control information 230 (for example, CSI part 1) at a same time (for example, in cascading stages).

After decoding the first type of control information 225 and the second type of control information 230, the base station 105-*a* may determine an updated tone map 235. For example, the subsets of tones for the first type of control information 225 and for the second type of control information 230 may be extracted and removed from the total set of tones in the shared channel message 210 based on the decoding, resulting in possibly updated N and D parameters for remaining tones and types of control information in the shared channel message 210. While the updated tone map 235 is being determined, the base station 105-*a* may also begin an extraction 240 to start extracting respective subsets of tones that correspond to remaining types of control information in the shared channel message 210. Subsequently, based on performing the tone classification on the fly, the base station 105-*a* may then decode a third type of control information 245 (for example, CSI part 2) and a second type of control information 250 (for example, SCH data) at a same time (for example, in cascading stages). In some examples, the base station 105-*a* may continue this tone classification method until each type of control information is determined or extracted from the shared channel message 210.

In some examples, the different types of control information in the shared channel message 210 (for example, HARQ-ACK feedback, reserved ACK bits, CSI part 1, CSI part 2, the SCH data) may have a same throughput that is scalable with a classification throughput for the tone classification method. The throughput for how many types of control information are determined (for example, classified) and extracted per cycle of the tone classification method (for example, two subsets of tones and corresponding types of control information per cycle, three subsets of tones and corresponding types of control information per cycle, or a higher throughput) may be independent of how many subsets of tones to classify for extracting and decoding the corresponding types of control information. For example, the tone classification method may not scale to three subsets of tones and corresponding types of control information per cycle with classifying the third subset of tones for extracting and decoding the third type of control information 245.

Two subsets of tones and corresponding types of control information are shown being classified and extracted per cycle in the example of FIG. 2 to match a modem throughput condition for the base station 105-*a*. In some examples, a tone classification may include six stages, in which each stage classifies one type of control information (for example, one tone type) and six total types of control information (for example, reference signals, reserved ACK bits, HARQ-ACK feedback, CSI part 1, CSI part 2, and SCH data) may be classified simultaneously. Additionally, the tone classification method may include two types of scalability. For example, a first type of scalability may include a throughput that is scalable to match a device throughput condition. Additionally or alternatively, a second type of scalability may include is a number of types of control information (for example, tone types) that are classified per cycle is scalable. In some examples, the tone classification method may use five stages if reference signals are removed prior to tone classification or may use six stages if reference signals are one of the types of control information classified.

By using this tone classification method, the base station 105-*a* may support dynamic, for example at-speed on the fly, tone classification that is also scalable to match different extraction throughputs (that is, a number of types of control information that are classified per cycle can be scaled up or down). Additionally, the tone classification method may reduce latency for the base station 105-*a* classifying each type of control information due to the dependency between different types of control information (for example, between CSI part 1 and CSI part 2). In some examples, a tone map parameter update may be independent of a total number of tones available to the shared channel message 210. Additionally, the tone classification method may simplify simultaneous extraction of two or more types of control information. For example, two type extraction may facilitate classifying and extracting CSI part 2 and SCH data to be de-rate matched (DRM) and decoded by polar and low-density parity-check (LDPC) decoders in parallel. In some examples, the tone classification method may be scalable to support MU-MIMO with an additional stage for DMRS/PTRS classification and may enable multiple users to be extracted in parallel to reduce de-map iterations.

Additionally or alternatively, the base station 105-*a* may use an on the fly tone mapping method based on determining a tone type (for example, a type of control information) on the N and D parameters of all tone types to determine a subset of tones for a first tone type based on one tone at a time. This method may monitor the N and D parameters of all tone types in counters. Subsequently, for each iteration or cycle, due to the dependency between tone types (for example, CSI part 1 indicating tone allocations for CSI part 2 and SCH data), the base station 105-*a* may check a condition to allocate a current tone to each tone type serially and may update all counter values after each iteration or cycle. The base station 105-*a* may iterate (for example, repeat) this process until all tones available to the shared channel message (for example, a PUSCH) are mapped.

Although the base station 105-*a* is shown performing the tone classification method with reference to FIG. 2, the tone classification method may also be used for sidelink communications (for example, in connected V2X (CV2X) communications for stage 2 physical sidelink control channels (PSCCHs)) and sidelink shared channel (for example, PSSCH) extraction. For example, the UE 115-*a* may transmit the shared channel message 210 (for example, a PSSCH message) to an additional UE 115 over a sidelink, and the additional UE 115 may use the tone classification method to determine different types of sidelink control information multiplexed in the shared channel message 210.

Figure 3:
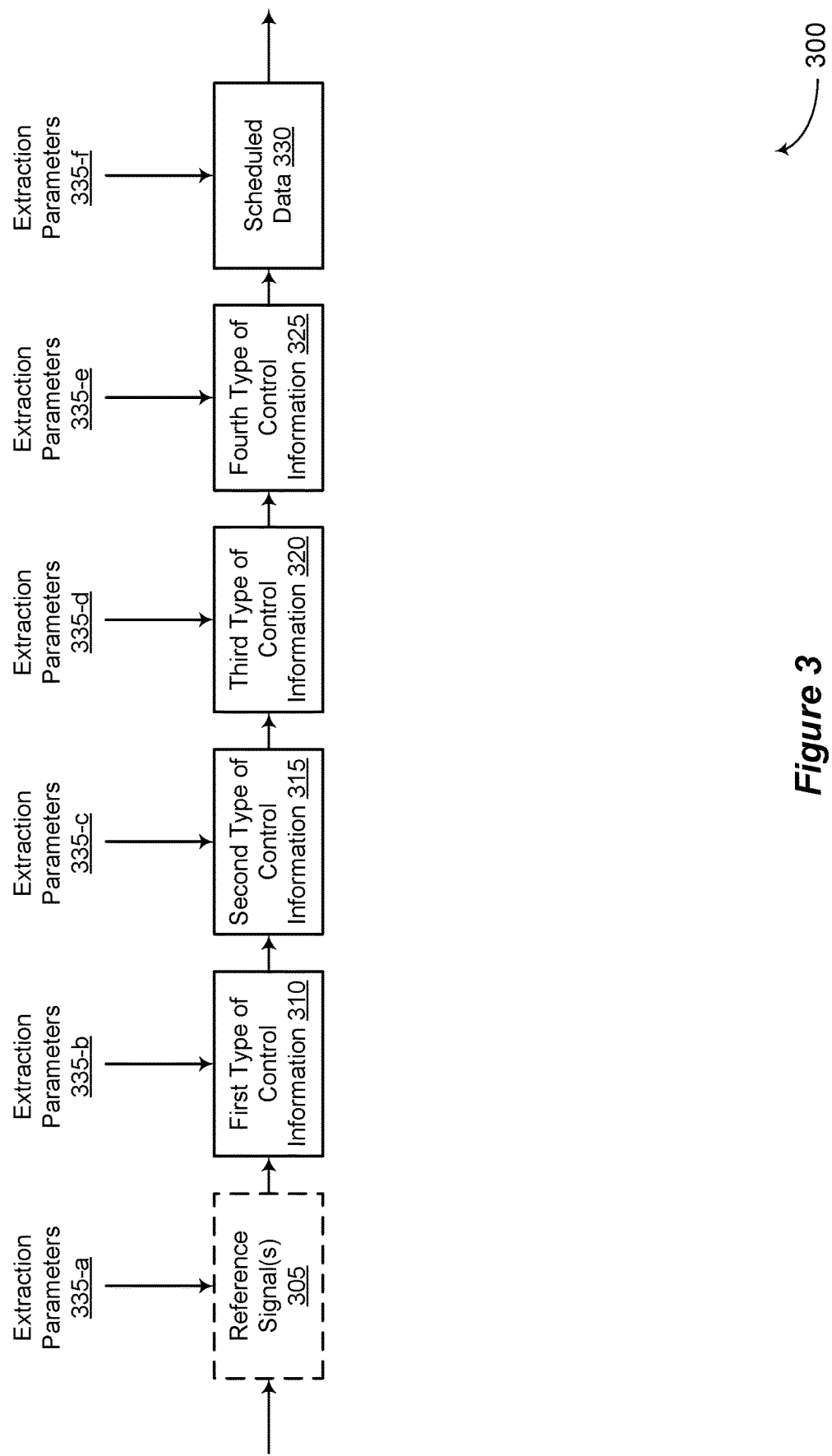
FIG. 3 illustrates an example of a tone classification for physical channels with multiplexed data in accordance with aspects of the present disclosure.

FIG. 3 illustrates an example of a tone classification 300 that supports tone classification for physical channels with multiplexed data in accordance with aspects of the present disclosure. In some example, the tone classification 300 may be implemented by or may implement aspects of the wireless communications systems 100 and 200. For example, a first wireless device (for example, a base station 105 or a UE 115) may use the tone classification 300 to determine different subsets of tones that correspond to different types of control information included in a shared channel message received from a second wireless device (for example, a UE 115). The tone classification 300 may implement the tone classification method described with reference to FIG. 2.

The tone classification 300 may proceed through five or more cascaded stages, in which each stage is identical and corresponds to one tone type (for example, one type of control information). The tone classification 300 may begin with a tone array (for example, represented by TM[1:0] that includes two tones) started with all "empty" types. Each stage may receive tones (for example, TM[1:0]) from a previous stage, may search for tones with available types, and may either keep original tone types or assign to new types based on N and D parameters (for example, extraction parameters). For each cycle, the first wireless device may map "empty" tones to either "empty" or "reserved ACK" by a first stage. With all stages performing similar operations, at the end of the tone classification 300, tones in the shared channel message may be classified to be one of the following: HARQ-ACK feedback, CSI part 1, CSI part 2, SCH data, CSI part 2 punctured by ACK, SCH data punctured by ACK, or a different type of control information. All the stages in the tone classification 300 may be identical and performs a same pseudo code. Additionally, the available tones may be mapped to new tone types based on the N and D parameters.

To support MU-MIMO at the first wireless device (for example, a base station 105), the tone classification 300 may include a first stage at the beginning to classify reference signals received from the second wireless device (for example, PTRS or DMRS tones). In some example, the first wireless device may support a first type of a cyclic prefix OFDM (CP-OFDM) configuration, which may use an additional extraction parameter (for example, an offset value). Additionally or alternatively, the first wireless device may support other configuration types for CP-OFDM and for DFT-S-OFDM with similar logics.

The proposed on-the-fly tone classification may enable a UE modem to support base station operations with UCI multiplexed on a PUSCH and for MU-MIMO. In some example, a throughput for the tone classification 300 may be two tone types per cycle (for example, two typed of control information) based on a de-mapper throughput. With the two tone types per cycle, the first wireless device may perform on the fly tone mapping and extraction two passes or cycles (for example, a first pass or cycle for a first type of control information such as HARQ-ACK feedback or reserved ACK bits and for a second type of control information such as CSI part 1; and a second pass or cycle for a third type of control information such as CSI part 2 and for a fourth type of control information such as SCH data) with a reduced pipeline bubble. Additionally or alternatively, the number of tones types per cycle that are classified and extracted may be scaled up or down as described with reference to FIG. 2. In addition, the tone classification 300 may support MU-MIMO with two users, which allows a de-mapper to keep DMRS/PTRS tones and send all log likelihood ratios (LLRs) to a decoder subsystem, while the decoder subsystem removes the reference signal tones and extract tones for two users simultaneously even if the two users belong to different user groups. Additionally, the tone classification 300 may be used to remove reference signals for both SU-MIMO and MU-MIMO.

In the example of FIG. 3, the tone classification 300 may include the first wireless device first classifying and extracting a subset of tones in the shared channel message for one or more reference signals 305 (for example, DMRS or PTRS) to associate previously "empty" tones in a tone array to the reference signals 305. The first wireless device may then continue to classify and extract different types of control information (for example, tone types) during subsequent stages of the tone classification 300. For example, the first wireless device may classify and extract subsets of tones for a first type of control information 310 (for example, reserved ACK bits), for a second type of control information 315 (for example, HARQ-ACK feedback), for a third type of control information 320 (for example, CSI part 1), for a fourth type of control information 325 (for example, CSI part 2), and for scheduled data 330 (for example, a fifth type of control information).

With each classification and extraction, the first wireless device may use a set of extraction parameters 335 corresponding to the type of control information (for example, tone type) classified at that stage, in which each stage may include an updated set of extraction parameters based on the previously extracted types of control information. For example, a first set of extraction parameters 335-*a* may be used for the reference signals 305, a second set of extraction parameters 335-*b* may be used for the first type of control information 310, a third set of extraction parameters 335-*c* may be used for the second type of control information 315, a fourth set of extraction parameters 335-*d* may be used for the third type of control information 320, a fifth set of extraction parameters 335-*e* may be used for the fourth type of control information 325, and a sixth set of extraction parameters 335-*f* may be used for the scheduled data 330.

Figure 4:
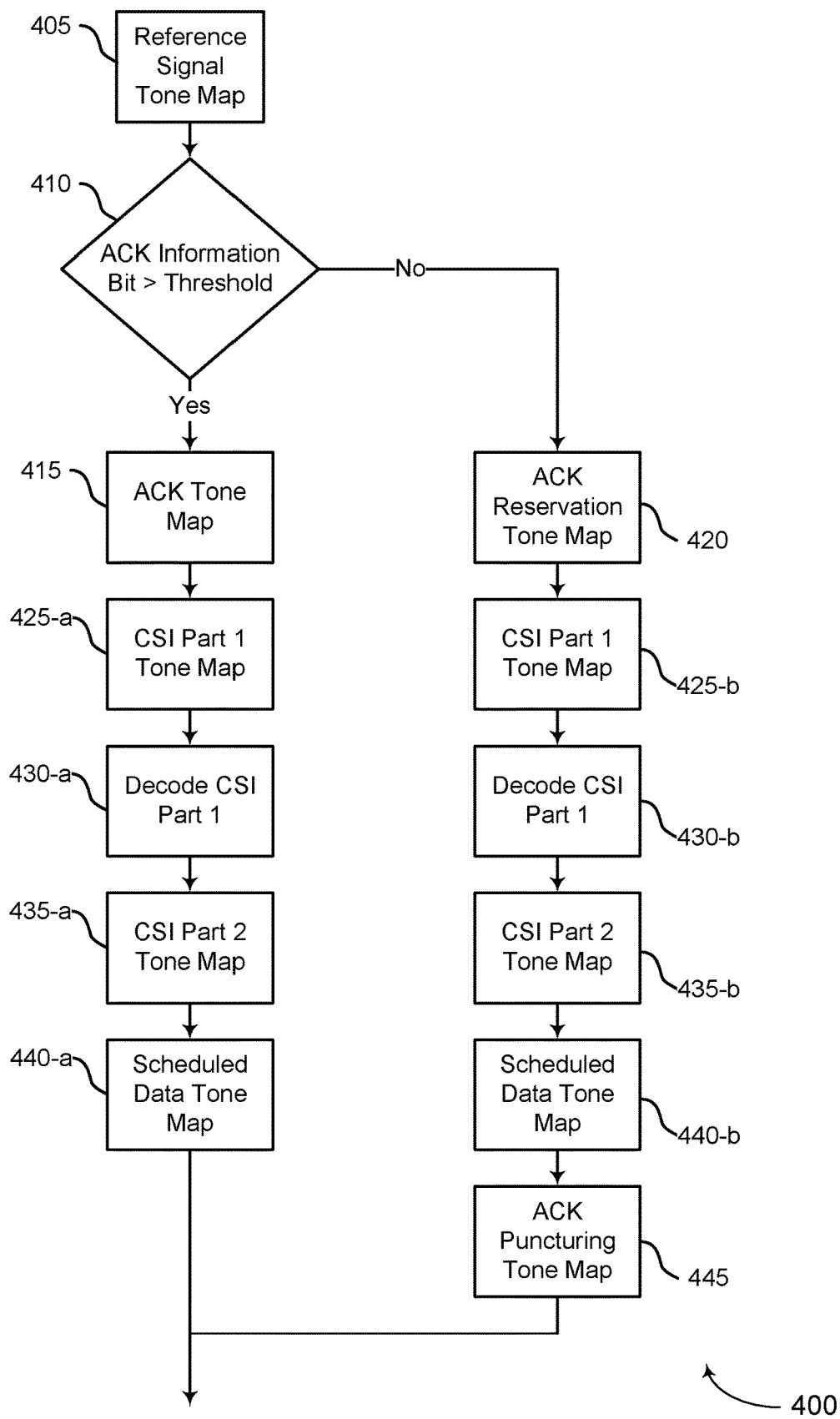
FIG. 4 illustrates an example of a tone mapping procedure in accordance with aspects of the present disclosure.

FIG. 4 illustrates an example of a tone mapping procedure 400 in accordance with aspects of the present disclosure. In some example, the tone mapping procedure 400 may be implemented by or may implement aspects of the wireless communications systems 100 and 200. For example, a first wireless device may perform the tone mapping procedure 400 for demultiplexing types of control information from a shared channel message received from a second wireless device.

At 405, the first wireless device may determine a reference signal tone map to classify and extract tones for reference signals received from the second wireless device. At 410, depending on a number of HARQ-ACK information bits, the first wireless device may perform a mapping process in a variable number of steps (for example, four or five steps), in which each step maps one tone type (that is, a type of control information) through the entire TB with the TB including all tones or REs of all OFDM symbols available for a PUSCH. For example, if the number of HARQ-ACK information bits is greater than a threshold value, the first wireless device may determine an ACK tone map at 415, determine a CSI part 1 tone map at 425-*a*, decode the CSI part 1 at 430-*a*, determine a CSI part 2 tone map at 435-*a*, and determine a scheduled data tone map at 440-*a*. Additionally or alternatively, if the number of HARQ-ACK information bits is less than the threshold value, the first wireless device may determine an ACK reservation bit tone map at 420, determine a CSI part 1 tone map at 425-*b*, decode CSI part 1 at 430-*b*, determine a CSI part 2 tone map at 435-*b*, determine a scheduled data tone map at 440-*b*, and determine an ACK puncturing tone map at 445.

In some cases, however, the CSI part 1 may be used to determine a number of information bits in the CSI part 2, introducing a dependency that the first wireless device tone maps, extracts, and decodes the CSI part 1 before tone mapping, extracting, and decoding the CSI part 2 and the UL-SCH data. As such, latency may be increased for the first wireless device for determining (for example, classifying) and extracting each type of control information (for example, tone type) from a shared channel message. The tone selection method described with reference to FIGS. 2 and 3 removes the dependency and increased latency from the determining and extracting each type of control information from the shared channel message.

Figure 5:
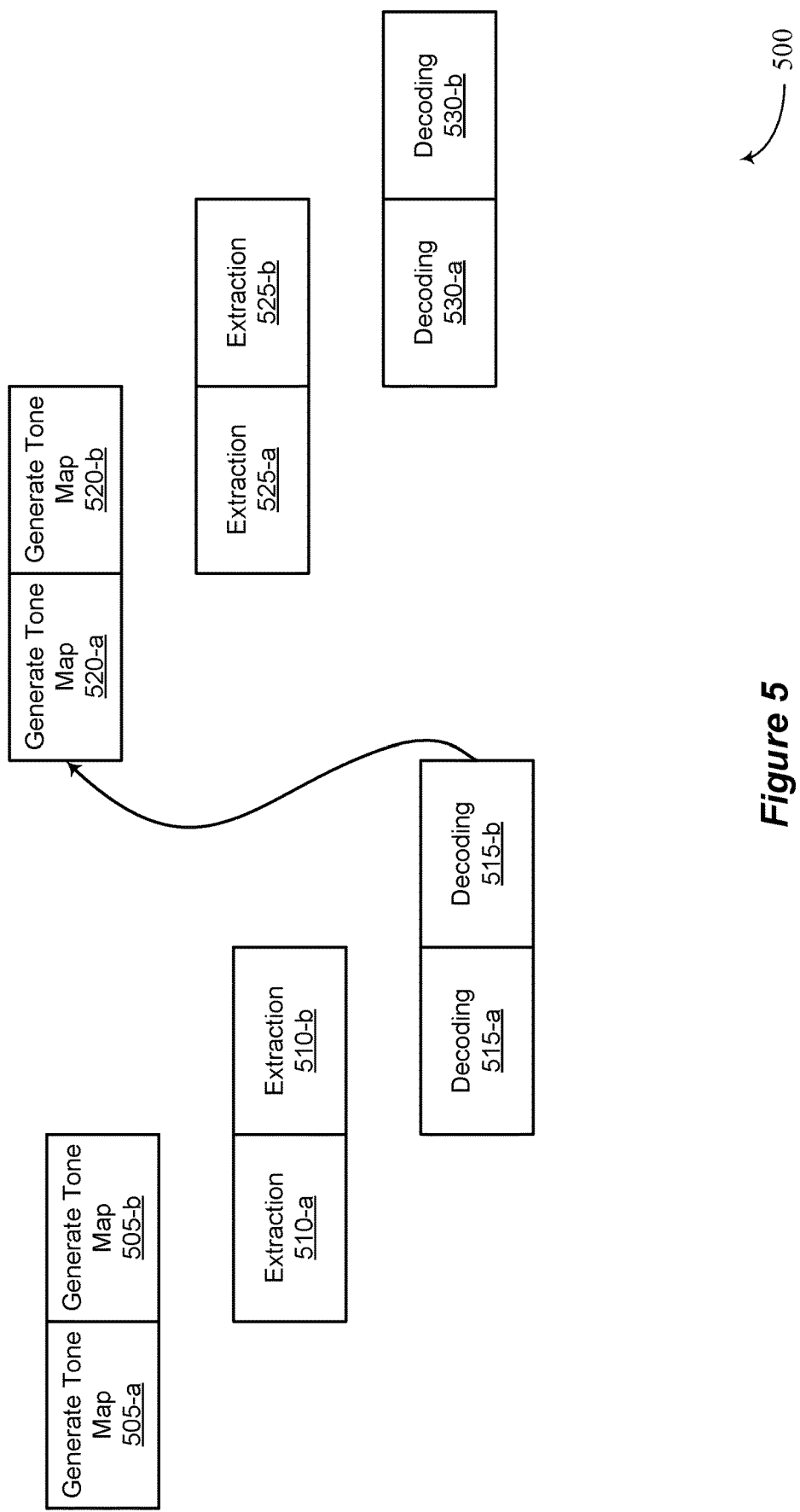
FIG. 5 illustrates an example of a tone mapping in accordance with aspects of the present disclosure.

FIG. 5 illustrates an example of a tone mapping 500 in accordance with aspects of the present disclosure. In some example, the tone mapping 500 may be implemented by or may implement aspects of the wireless communications systems 100 and 200. For example, a first wireless device may perform the tone mapping 500 for demultiplexing types of control information from a shared channel message received from a second wireless device.

In some cases, if demultiplexing different types of control information from the shared channel message, the first wireless device may use a tone mapping method to compute the tone allocations and may store the tone allocations as a look up table (for example, with the look up table having a size of 137592 bit/TB based on 14 symbols per TB*3276 tones per symbol*3 bits per tone) to support a maximum bandwidth. However, although tone map computation, tone extraction, and CB decoding are performed in pipeline stages to reduce latency using this tone mapping method, a dependency between the CSI part 1 and the CSI part 2 may create a pipeline bubble such that the CSI part 2 tone map computation is visible to an overall latency.

For example, the first wireless device may generate a first tone map 505-*a* for a first type of control information (for example, reference signals, HARQ-ACK bits, or reserved ACK bits). The first wireless device may then generate a second tone map 505-*b* for a second type of control information (for example, CSI part 1) while also extracting tones for the first type of control information during an extraction 510-*a* based on the first tone map 505-*a*. Subsequently, the first wireless device may then perform an extraction 510-*b* to extract tones for the second type of control information while also performing a decoding 515-*a* for decoding the first type of control information. The first wireless device may then perform a decoding 515-*b* to decode the second type of control information.

Based on decoding the second type of control information, the first wireless device may determine a tone allocation for a third type of control information (for example, CSI part 2) and for a fourth type of control information (for example, scheduled data). Subsequently, the first wireless device may generate a third tone map 520-*a* for the third type of control information. The first wireless device may also generate a fourth tone map 520-b for the fourth type of control information while also performing an extraction 525-a to extract tones for the third type of control information. The first wireless device may then perform an extraction 525-b to extract tones for the fourth type of control information while also performing a decoding 530-a for decoding the third type of control information. Subsequently, the first wireless device may then perform a decoding 530-b for decoding the fourth type of control information.

As can be seen with the linearity and pipeline stages (for example, each stage occurs one after the other), the latency may increase for the first wireless device to extract each type of control information from the shared channel message based on waiting to tone map, extract, and decode the second type of control information before tone mapping, extracting, and decoding the third and fourth types of control information. The tone selection method described with reference to FIGS. 2 and 3 removes the dependency and increased latency from the determining and extracting each type of control information from the shared channel message based on enabling the first wireless device to simultaneously tone map, extract, and decode the second type of control information with the third and fourth types of control information (for example, on the fly).

Figure 6:
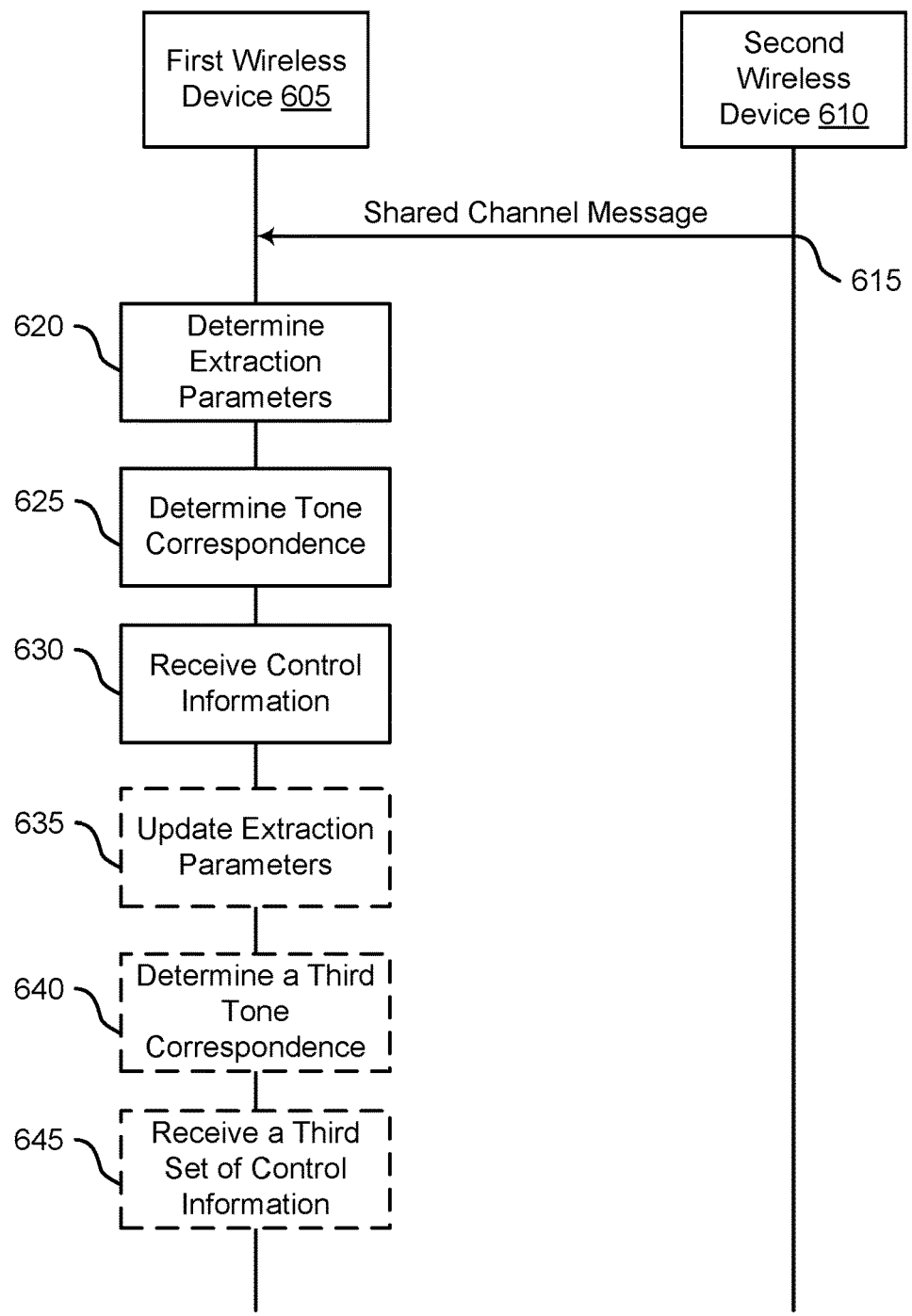
FIG. 6 illustrates an example of a process flow that supports tone classification for physical channels with multiplexed data in accordance with aspects of the present disclosure.

FIG. 6 illustrates an example of a process flow 600 that supports tone classification for physical channels with multiplexed data in accordance with aspects of the present disclosure. In some examples, the process flow 600 may be implemented by or may implement aspects of wireless communications systems 100 and 200. For example, the process flow 600 may include a first wireless device 605 and a second wireless device 610 which may represent examples of base stations 105, UEs 115, or additional wireless devices, as described with reference to FIGS. 1-5.

In the following description of the process flow 600, the operations between the first wireless device 605 and the second wireless device 610 may be transmitted in a different order than the exemplary order shown, or the operations performed by the first wireless device 605 and the second wireless device 610 may be performed in different orders or at different times. Certain operations may also be left out of the process flow 600, or other operations may be added to the process flow 600. It is to be understood that although the first wireless device 605 and the second wireless device 610 are shown performing a number of the operations of process flow 600, any wireless device may perform the operations shown.

At 615, the first wireless device 605 may receive a shared channel message from the second wireless device 610. The shared channel message may include a set of tones carrying control information of a set of types of control information multiplexed in the set of tones. In some examples, the first wireless device 605 may be a base station 105, the second wireless device 610 may be a UE 115, the shared channel message may be an uplink shared channel message (for example, a PUSCH), and the set of types of control information may include a set of types of UCI. Additionally or alternatively, the first wireless device may be a first UE 115, the second wireless device 610 may be a second UE 115, the shared channel message may be a sidelink shared channel message (for example, a PSSCH), and the set of types of control information may include a set of types of SCI. In some examples, the set of the types of control information may include one or more of reference signals (for example, PTRS or DMRS), acknowledgement feedback (for example, HARQ-ACK feedback, reserved ACK bits, or punctured ACK bits), CSI part 1, CSI part 2, or SCH data (for example, UL-SCH data).

At 620, the first wireless device 605 may determine one or more extraction parameters for each type in the set of types of control information. In some examples, the one or more extraction parameters may include one or more of a total number of tones in the set of tones (for example, N parameter), a distance between each tone in the set of tones (for example, D parameter), or an offset value.

At 625, the first wireless device 605 may determine a first subset of tones of the set of tones carries first control information of a first type of the set of types of control information and a second subset of tones of the set of tones carries second control information of a second type of the set of types of control information based on respective extraction parameters of the one or more extraction parameters, in which the determining of the first subset of tones at least partially overlaps in time with the determining of the second subset of tones. In some examples, determining the first subset of tones carries the first control information and the second subset of tones carries the second control information may be based on a tone classification throughput associated with the first wireless device, in which the tone classification throughput includes a number of types of control information determined in a single operation.

In some examples, the first wireless device 605 may determine a subset of tones of the set of tones carries a reference signal before determining the first subset of tones carries the first control information and the second subset of tones carries the second control information. Additionally, the determining of the first subset of tones may at least partially overlap in time with the determining of the second subset of tones. For example, the first wireless device 605 may receive, from the second wireless device 610, a reference signal message including the reference signal, in which the reference signal includes one or more of a PTRS or a DMRS. Additionally, the first wireless device 605 may determine subsets of tones of the set of tones carry different types of control information of the set of types of control information for multiple wireless devices based on determining the subset of tones carries the reference signal. Additionally or alternatively, the subset of tones may be determined to carry the reference signal for a SU-MIMO configuration.

In some example, different subsets of tones of the set of tones may be determined to carry respective types of control information of the set of types of control information based on a tone classification throughput that is scalable to match a device throughput of the first wireless device 605, in which the tone classification throughput includes a number of types of control information determined in a single operation. Additionally or alternatively, different subsets of tones of the set of tones may be determined to carry respective types of control information of the set of types of control information based on a tone classification throughput that is scalable.

At 630, the first wireless device 605 may receive the first control information and the second control information based on the determining at 625.

At 635, in some examples, the first wireless device 605 may update the respective extraction parameters of the one or more extraction parameters based on determining the first subset of tones carries the first control information and the second subset of tones carries the second control information.

At 640, the first wireless device may determine a third subset of tones of the set of tones carries third control information of a third type of the set of types of control information based on the updated one or more extraction parameters.

At 645, the first wireless device may receive the third control information based on determining the third subset of tones. In some cases, a tone allocation for the third control information may be based on a content in one or both of the first control information or the second control information.

Figure 7:
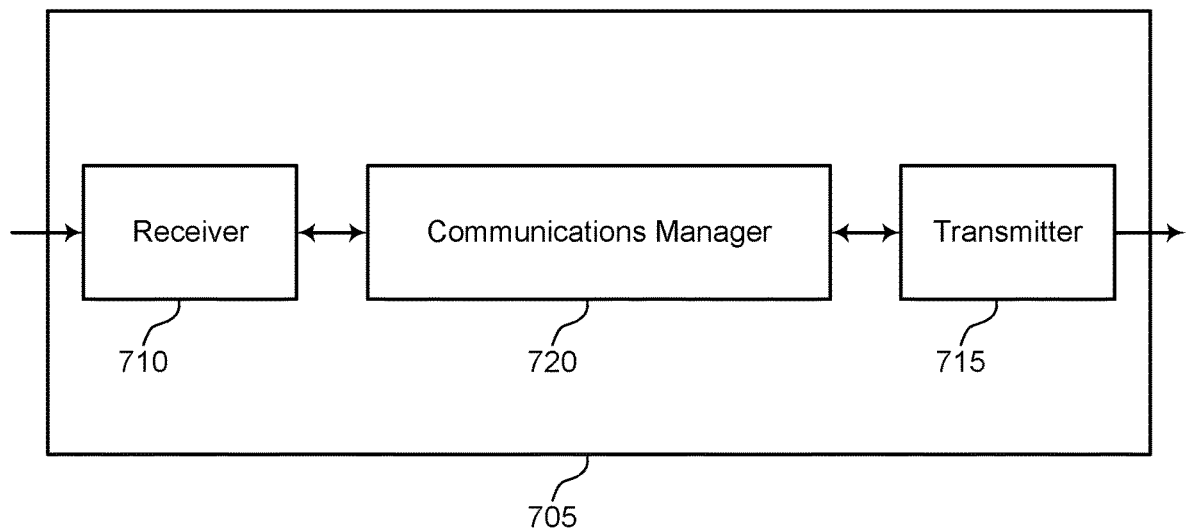
FIGS. 7 and 8 show block diagrams of devices that support tone classification for physical channels with multiplexed data in accordance with aspects of the present disclosure.

FIG. 7 shows a block diagram of a device 705 that supports tone classification for physical channels with multiplexed data in accordance with aspects of the present disclosure. The device 705 may be an example of aspects of a UE 115 as described herein. The device 705 may include a receiver 710, a transmitter 715, and a communications manager 720. The device 705 can be implemented, at least in part, by one or both of a modem and a processor. Each of these components may be in communication with one another (for example, via one or more buses).

The receiver 710 may provide a means for receiving information such as packets, user data, control information, or any combination thereof associated with various information channels (for example, control channels, data channels, information channels related to tone classification for physical channels with multiplexed data). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (for example, control channels, data channels, information channels related to tone classification for physical channels with multiplexed data). In some examples, the transmitter 715 may be co-located with a receiver 710 in a transceiver component. The transmitter 715 may utilize a single antenna or a set of multiple antennas.

The communications manager 720, the receiver 710, the transmitter 715, or various combinations thereof or various components thereof may be examples of means for performing various aspects of tone classification for physical channels with multiplexed data as described herein. For example, the communications manager 720, the receiver 710, the transmitter 715, or various combinations or components thereof may support a method for performing one or more of the functions described herein.

Additionally or alternatively, in some examples, the communications manager 720, the receiver 710, the transmitter 715, or various combinations or components thereof may be implemented in code (for example, as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (for example, configured as or otherwise supporting a means for performing the functions described in the present disclosure).

In some examples, the communications manager 720 may be configured to perform various operations (for example, receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first wireless device in accordance with examples as disclosed herein. For example, the communications manager 720 may be configured as or otherwise support a means for receiving, from a second wireless device, a shared channel message, the shared channel message including a set of tones carrying control information of a set of multiple types of control information multiplexed in the set of tones. The communications manager 720 may be configured as or otherwise support a means for determining one or more extraction parameters for each type of the set of multiple types of control information. The communications manager 720 may be configured as or otherwise support a means for determining a first subset of tones of the set of tones carries first control information of a first type of the set of multiple types of control information and a second subset of tones of the set of tones carries second control information of a second type of the set of multiple types of control information based on respective extraction parameters of the one or more extraction parameters, the determining of the first subset of tones at least partially overlapping in time with the determining of the second subset of tones. The communications manager 720 may be configured as or otherwise support a means for receiving the first control information and the second control information based on the determining of the first subset of tones and the second subset of tones.

By including or configuring the communications manager 720 in accordance with examples as described herein, the device 705 (for example, a processor controlling or otherwise coupled to the receiver 710, the transmitter 715, the communications manager 720, or a combination thereof) may support techniques for enhanced processing, reduced latency, and more efficient utilization of communication resources. For example, based on determining the extraction parameters and determining multiple subsets of tones for corresponding types of control information at once, the device 705 may support an at-speed on the fly tone classification without memories that is scalable to match an extraction throughput, as well as reduce latency based on a dependency of different CSI parts (that is, the device 705 may extract the different CSI parts at once rather than one at a time, reducing latency). Additionally, the device 705 may extract multiple types of control information at once, leading to a more efficient use of the resources used to carry the control information.

Figure 8:
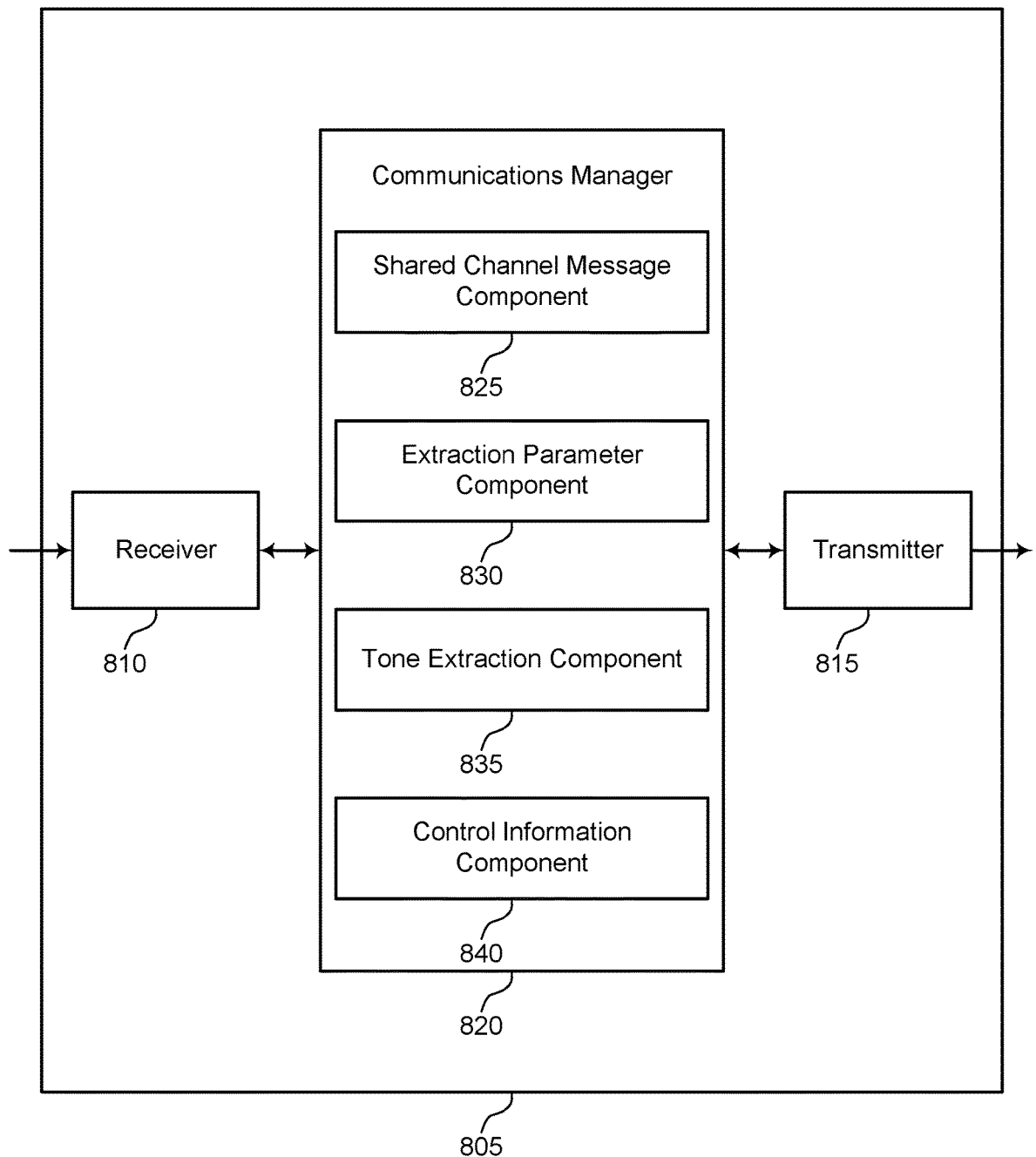

FIG. 8 shows a block diagram of a device 805 that supports tone classification for physical channels with multiplexed data in accordance with aspects of the present disclosure. The device 805 may be an example of aspects of a device 705 or a UE 115 as described herein. The device 805 may include a receiver 810, a transmitter 815, and a communications manager 820. The device 805 can be implemented, at least in part, by one or both of a modem and a processor. Each of these components may be in communication with one another (for example, via one or more buses).

The receiver 810 may provide a means for receiving information such as packets, user data, control information, or any combination thereof associated with various information channels (for example, control channels, data channels, information channels related to tone classification for physical channels with multiplexed data). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (for example, control channels, data channels, information channels related to tone classification for physical channels with multiplexed data). In some examples, the transmitter 815 may be co-located with a receiver 810 in a transceiver component. The transmitter 815 may utilize a single antenna or a set of multiple antennas.

The device 805, or various components thereof, may be an example of means for performing various aspects of tone classification for physical channels with multiplexed data as described herein. For example, the communications manager 820 may include a shared channel message component 825, an extraction parameter component 830, a tone extraction component 835, a control information component 840, or any combination thereof. The communications manager 820 may be an example of aspects of a communications manager 720 as described herein. In some examples, the communications manager 820, or various components thereof, may be configured to perform various operations (for example, receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first wireless device in accordance with examples as disclosed herein. The shared channel message component 825 may be configured as or otherwise support a means for receiving, from a second wireless device, a shared channel message, the shared channel message including a set of tones carrying control information of a set of multiple types of control information multiplexed in the set of tones. The extraction parameter component 830 may be configured as or otherwise support a means for determining one or more extraction parameters for each type of the set of multiple types of control information. The tone extraction component 835 may be configured as or otherwise support a means for determining a first subset of tones of the set of tones carries first control information of a first type of the set of multiple types of control information and a second subset of tones of the set of tones carries second control information of a second type of the set of multiple types of control information based on respective extraction parameters of the one or more extraction parameters, the determining of the first subset of tones at least partially overlapping in time with the determining of the second subset of tones. The control information component 840 may be configured as or otherwise support a means for receiving the first control information and the second control information based on the determining of the first subset of tones and the second subset of tones.

Figure 9:
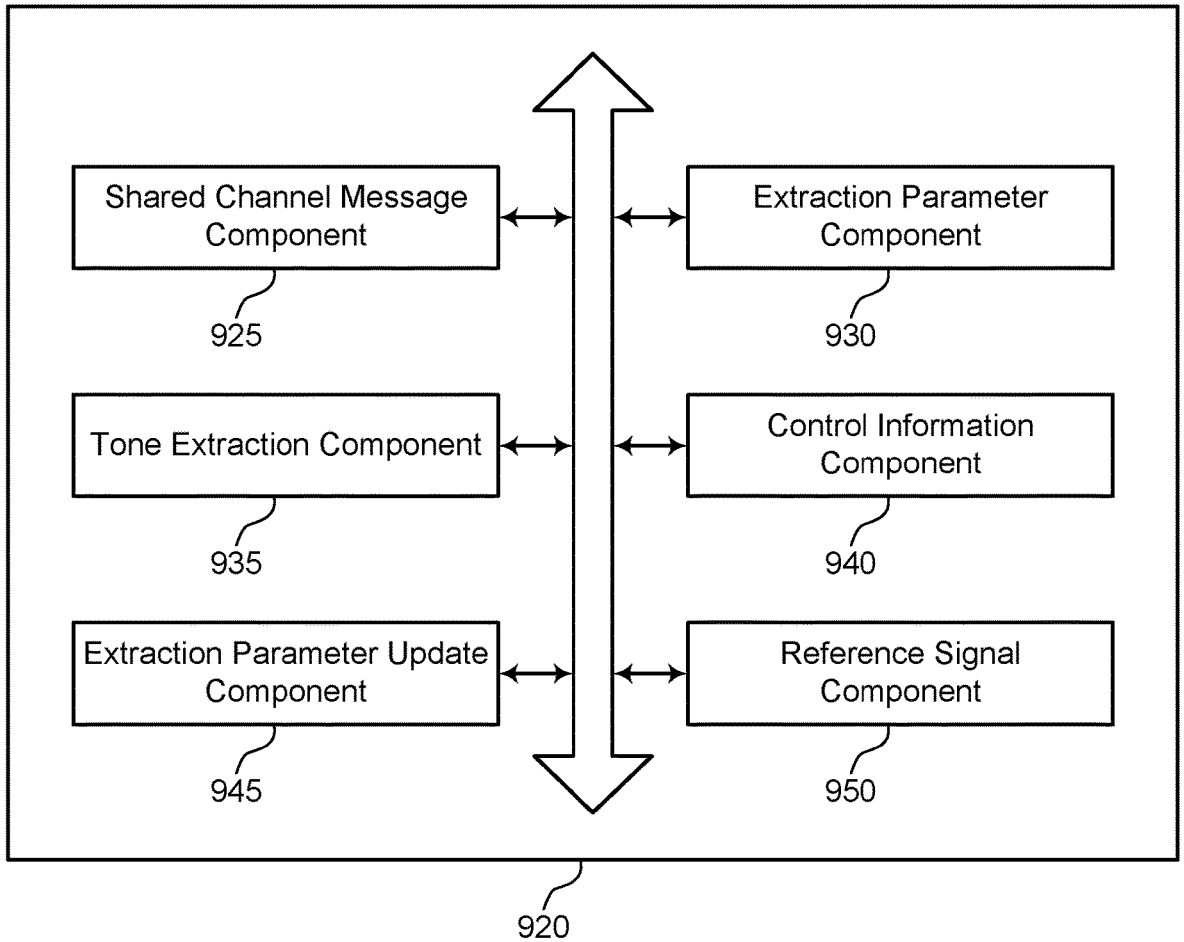
FIG. 9 shows a block diagram of a communications manager that supports tone classification for physical channels with multiplexed data in accordance with aspects of the present disclosure.

FIG. 9 shows a block diagram of a communications manager 920 that supports tone classification for physical channels with multiplexed data in accordance with aspects of the present disclosure. The communications manager 920 may be an example of aspects of a communications manager 720, a communications manager 820, or both, as described herein. The communications manager 920, or various components thereof, may be an example of means for performing various aspects of tone classification for physical channels with multiplexed data as described herein. For example, the communications manager 920 may include a shared channel message component 925, an extraction parameter component 930, a tone extraction component 935, a control information component 940, an extraction parameter update component 945, a reference signal component 950, or any combination thereof. Each of these components may communicate, directly or indirectly, with one another (for example, via one or more buses).

The communications manager 920 may support wireless communications at a first wireless device in accordance with examples as disclosed herein. The shared channel message component 925 may be configured as or otherwise support a means for receiving, from a second wireless device, a shared channel message, the shared channel message including a set of tones carrying control information of a set of multiple types of control information multiplexed in the set of tones. The extraction parameter component 930 may be configured as or otherwise support a means for determining one or more extraction parameters for each type of the set of multiple types of control information. The tone extraction component 935 may be configured as or otherwise support a means for determining a first subset of tones of the set of tones carries first control information of a first type of the set of multiple types of control information and a second subset of tones of the set of tones carries second control information of a second type of the set of multiple types of control information based on respective extraction parameters of the one or more extraction parameters, the determining of the first subset of tones at least partially overlapping in time with the determining of the second subset of tones. The control information component 940 may be configured as or otherwise support a means for receiving the first control information and the second control information based on the determining of the first subset of tones and the second subset of tones.

In some examples, the extraction parameter update component 945 may be configured as or otherwise support a means for updating respective extraction parameters of the one or more extraction parameters based on determining the first subset of tones carries the first control information and the second subset of tones carries the second control information. In some examples, the extraction parameter update component 945 may be configured as or otherwise support a means for determining a third subset of tones of the set of tones carries third control information of a third type of the set of multiple types of control information based on the updated one or more extraction parameters. In some examples, the extraction parameter update component 945 may be configured as or otherwise support a means for receiving the third control information based on the determining of the third subset of tones.

In some examples, a tone allocation for the third control information is based on a content in one or more of the first control information or the second control information.

In some examples, the reference signal component 950 may be configured as or otherwise support a means for determining a subset of tones of the set of tones carries a reference signal before determining the first subset of tones carries the first control information and the second subset of tones carries the second control information.

In some examples, the reference signal component 950 may be configured as or otherwise support a means for determining subsets of tones of the set of tones carry different types of control information of the set of multiple types of control information for multiple wireless devices based on determining the subset of tones carries the reference signal.

In some examples, the reference signal component 950 may be configured as or otherwise support a means for receiving, from the second wireless device, a reference signal message including the reference signal, in which the reference signal includes one or more of a phase tracking reference signal or a demodulation reference signal.

In some examples, the subset of tones are determined to carry the reference signal for a single user multiple input multiple output configuration.

In some examples, the tone extraction component 935 may be configured as or otherwise support a means for determining the first subset of tones carries the first control information and the second subset of tones carries the second control information is based on a tone classification throughput associated with the first wireless device, the tone classification throughput including a number of types of control information determined in a single operation.

In some examples, the one or more extraction parameters include one or more of a total number of tones in the set of tones, a distance between each tone in the set of tones, or an offset value.

In some examples, the first wireless device includes a base station, the second wireless device includes a UE, the shared channel message includes an uplink shared channel message, and the set of multiple types of control information includes a set of multiple types of uplink control information.

In some examples, the first wireless device includes a first UE, the second wireless device includes a second UE, the shared channel message includes a sidelink shared channel message, and the set of multiple types of control information includes a set of multiple types of sidelink control information.

In some examples, a tone allocation for a third control information of a third type of the set of multiple types of control information, for scheduled data, or for both is based on a content of the first control information, the second control information, or both.

In some examples, different subsets of tones of the set of tones are determined to carry respective types of control information of the set of multiple types of control information based on a tone classification throughput that is scalable to match a device throughput of the first wireless device, the tone classification throughput including a number of types of control information determined in a single operation.

In some examples, different subsets of tones of the set of tones are determined to carry respective types of control information of the set of multiple types of control information based on a tone classification throughput that is scalable, the tone classification throughput including a number of types of control information determined in a single operation.

In some examples, the set of multiple the types of control information includes one or more of reference signals, acknowledgement feedback, channel state information part one, channel state information part two, or scheduled data.

Figure 10:
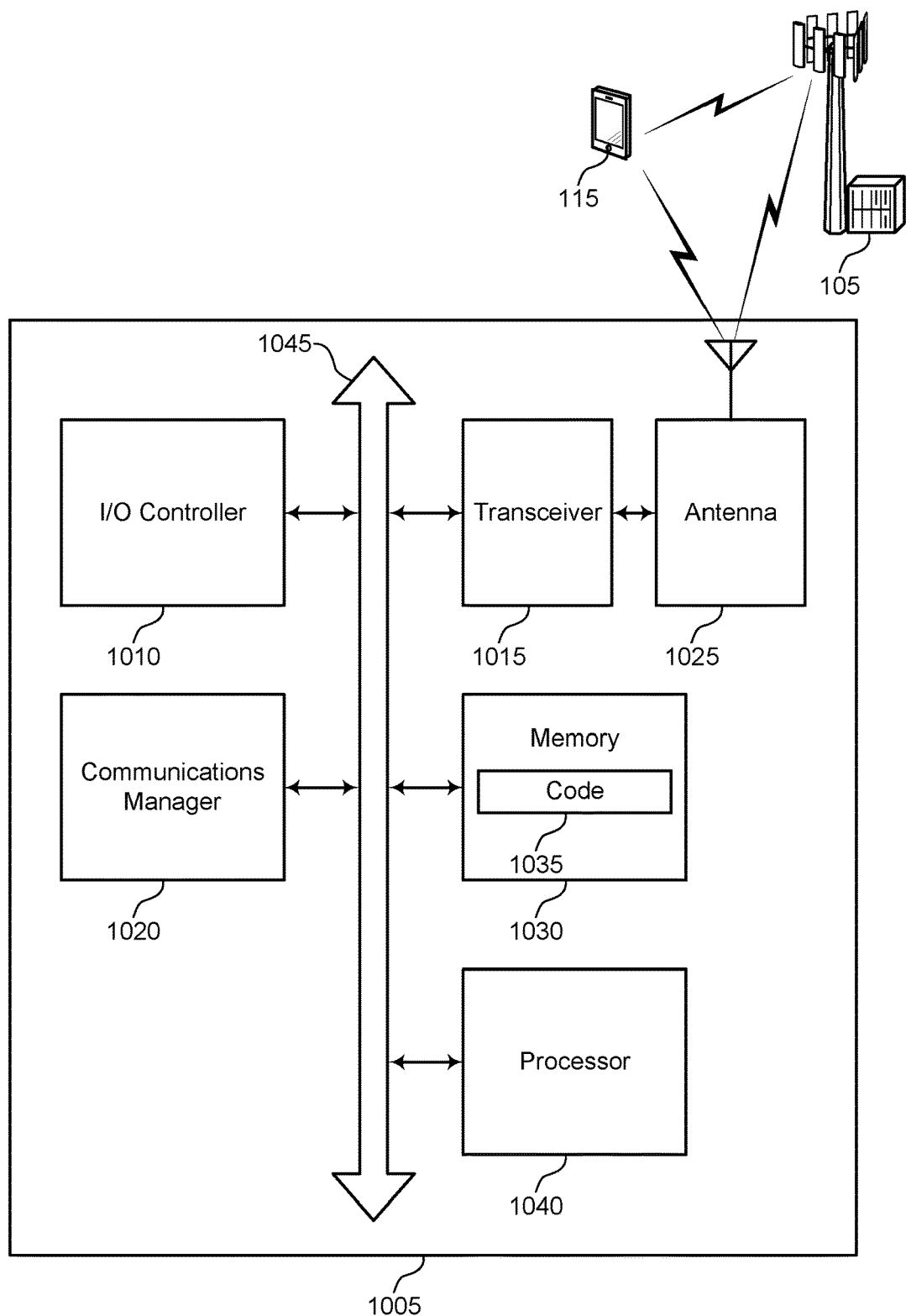
FIGS. 10 and 11 show diagrams of systems including devices that support tone classification for physical channels with multiplexed data in accordance with aspects of the present disclosure.

FIG. 10 shows a diagram of a system including a device 1005 that supports tone classification for physical channels with multiplexed data in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an I/O controller 1010, a transceiver 1015, an antenna 1025, a memory 1030, code 1035, and a processor 1040. These components may be in electronic communication or otherwise coupled (for example, operatively, communicatively, functionally, electronically, electrically) via one or more buses (for example, a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, if executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (for example, if compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (for example, the memory 1030) to cause the device 1005 to perform various functions (for example, functions or tasks supporting tone classification for physical channels with multiplexed data). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first wireless device in accordance with examples as disclosed herein. For example, the communications manager 1020 may be configured as or otherwise support a means for receiving, from a second wireless device, a shared channel message, the shared channel message including a set of tones carrying control information of a set of multiple types of control information multiplexed in the set of tones. The communications manager 1020 may be configured as or otherwise support a means for determining one or more extraction parameters for each type of the set of multiple types of control information. The communications manager 1020 may be configured as or otherwise support a means for determining a first subset of tones of the set of tones carries first control information of a first type of the set of multiple types of control information and a second subset of tones of the set of tones carries second control information of a second type of the set of multiple types of control information based on respective extraction parameters of the one or more extraction parameters, the determining of the first subset of tones at least partially overlapping in time with the determining of the second subset of tones. The communications manager 1020 may be configured as or otherwise support a means for receiving the first control information and the second control information based on the determining of the first subset of tones and the second subset of tones.

By including or configuring the communications manager 1020 in accordance with examples as described herein, the device 1005 may support techniques for reduced latency, more efficient utilization of communication resources, and improved utilization of processing capability. For example, based on determining multiple subsets of tones at once for respective types of control information, a processor of the device 1005 may receive different portions of a shared channel message faster and with using the resources more efficiently (for example, rather than extracting a single type of control information at a time, the device 1005 may extract multiple types of control information at once).

In some examples, the communications manager 1020 may be configured to perform various operations (for example, receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of tone classification for physical channels with multiplexed data as described herein, or the processor 1040 and the memory 1030 may be otherwise configured to perform or support such operations.

Figure 11:
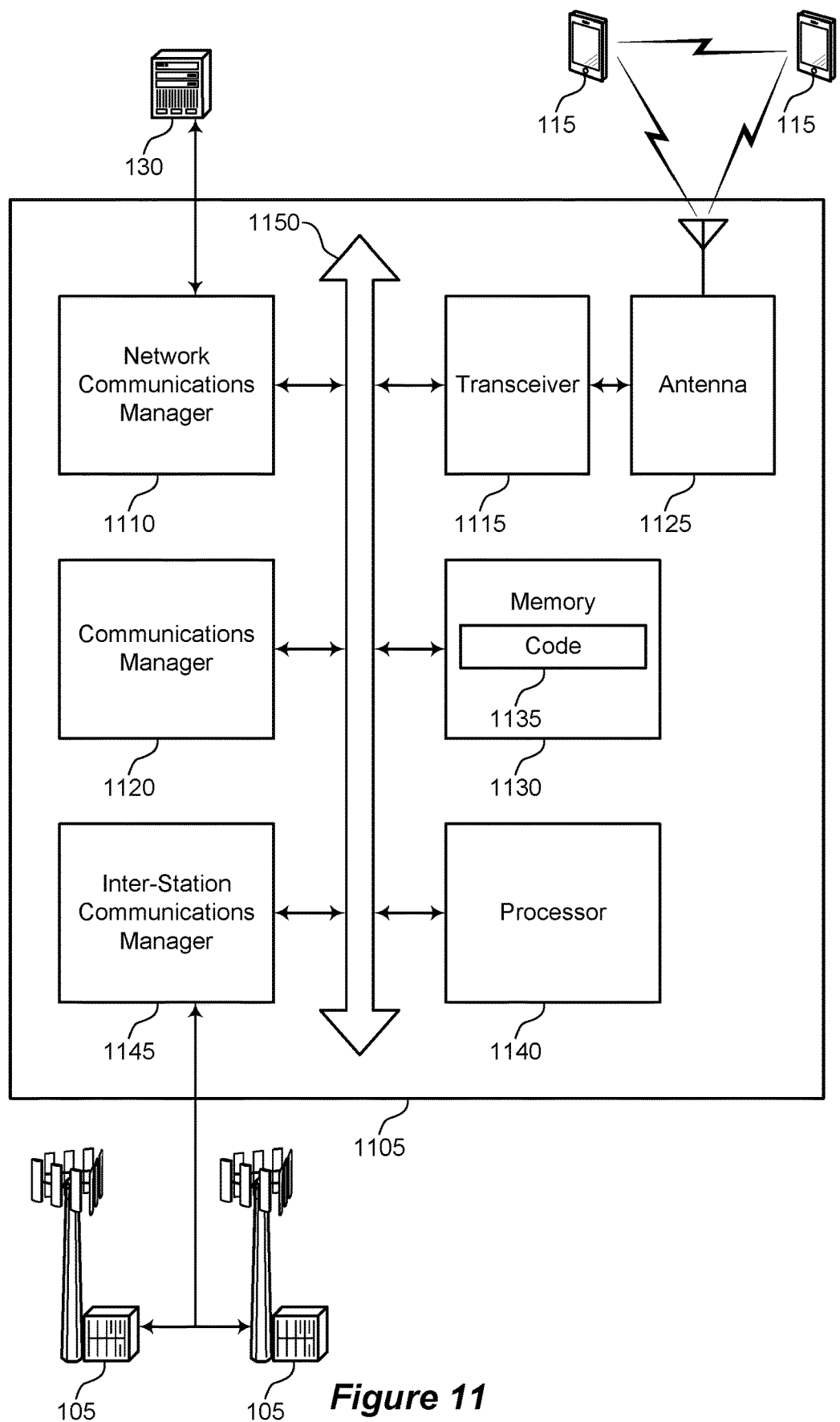

FIG. 11 shows a diagram of a system including a device 1105 that supports tone classification for physical channels with multiplexed data in accordance with aspects of the present disclosure. The device 1105 may be an example of or include the components of a device 705, a device 805, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (for example, operatively, communicatively, functionally, electronically, electrically) via one or more buses (for example, a bus 1150).

The network communications manager 1110 may manage communications with a core network (for example, via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 715, a transmitter 815, a receiver 710, a receiver 810, or any combination thereof or component thereof, as described herein.

The memory 1130 may include RAM and ROM. The memory 1130 may store computer-readable, computer-executable code 1135 including instructions that, if executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (for example, if compiled and executed) to perform functions described herein. In some cases, the memory 1130 may contain, among other things, a BIOS which may control basic hardware or software operation such as the interaction with peripheral components or devices.

The processor 1140 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (for example, the memory 1130) to cause the device 1105 to perform various functions (for example, functions or tasks supporting tone classification for physical channels with multiplexed data). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a first wireless device in accordance with examples as disclosed herein. For example, the communications manager 1120 may be configured as or otherwise support a means for receiving, from a second wireless device, a shared channel message, the shared channel message including a set of tones carrying control information of a set of multiple types of control information multiplexed in the set of tones. The communications manager 1120 may be configured as or otherwise support a means for determining one or more extraction parameters for each type of the set of multiple types of control information. The communications manager 1120 may be configured as or otherwise support a means for determining a first subset of tones of the set of tones carries first control information of a first type of the set of multiple types of control information and a second subset of tones of the set of tones carries second control information of a second type of the set of multiple types of control information based on respective extraction parameters of the one or more extraction parameters, the determining of the first subset of tones at least partially overlapping in time with the determining of the second subset of tones. The communications manager 1120 may be configured as or otherwise support a means for receiving the first control information and the second control information based on the determining of the first subset of tones and the second subset of tones.

By including or configuring the communications manager 1120 in accordance with examples as described herein, the device 1105 may support techniques for reduced latency, more efficient utilization of communication resources, and improved utilization of processing capability. For example, based on determining multiple subsets of tones at once for respective types of control information, a processor of the device 1105 may receive different portions of a shared channel message faster and with using the resources more efficiently (for example, rather than extracting a single type of control information at a time, the device 1105 may extract multiple types of control information at once).

In some examples, the communications manager 1120 may be configured to perform various operations (for example, receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of tone classification for physical channels with multiplexed data as described herein, or the processor 1140 and the memory 1130 may be otherwise configured to perform or support such operations.

Figure 12:
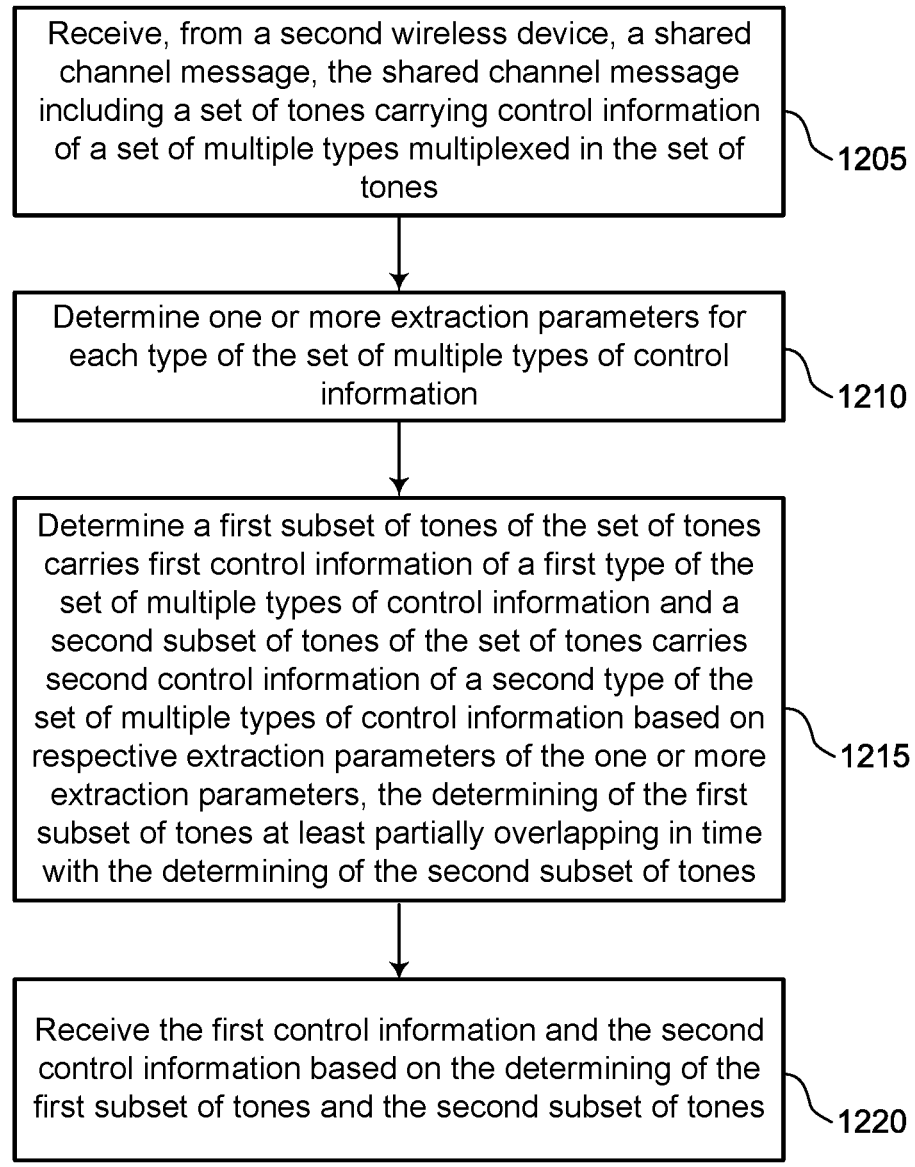
FIGS. 12-15 show flowcharts illustrating methods that support tone classification for physical channels with multiplexed data in accordance with aspects of the present disclosure.

FIG. 12 shows a flowchart illustrating a method that supports tone classification for physical channels with multiplexed data in accordance with aspects of the present disclosure. The operations of the method may be implemented by a UE or its components as described herein. For example, the operations of the method may be performed by a UE 115 or a base station 105 as described with reference to FIGS. 1-11. In some examples, a UE or a base station may execute a set of instructions to control the functional elements of the UE or the base station to perform the described functions. Additionally or alternatively, the UE or the base station may perform aspects of the described functions using special-purpose hardware.

At 1205, the method may include receiving, from a second wireless device, a shared channel message, the shared channel message including a set of tones carrying control information of a set of multiple types multiplexed in the set of tones. The operations of 1205 may be performed in accordance with examples as disclosed herein. In some examples, aspects of the operations of 1205 may be performed by a shared channel message component 925 as described with reference to FIG. 9.

At 1210, the method may include determining one or more extraction parameters for each type of the set of multiple types of control information. The operations of 1210 may be performed in accordance with examples as disclosed herein. In some examples, aspects of the operations of 1210 may be performed by an extraction parameter component 930 as described with reference to FIG. 9.

At 1215, the method may include determining a first subset of tones of the set of tones carries first control information of a first type of the set of multiple types of control information and a second subset of tones of the set of tones carries second control information of a second type of the set of multiple types of control information based on respective extraction parameters of the one or more extraction parameters, the determining of the first subset of tones at least partially overlapping in time with the determining of the second subset of tones. The operations of 1215 may be performed in accordance with examples as disclosed herein. In some examples, aspects of the operations of 1215 may be performed by a tone extraction component 935 as described with reference to FIG. 9.

At 1220, the method may include receiving the first control information and the second control information based on the determining of the first subset of tones and the second subset of tones. The operations of 1220 may be performed in accordance with examples as disclosed herein. In some examples, aspects of the operations of 1220 may be performed by a control information component 940 as described with reference to FIG. 9.

Figure 13:
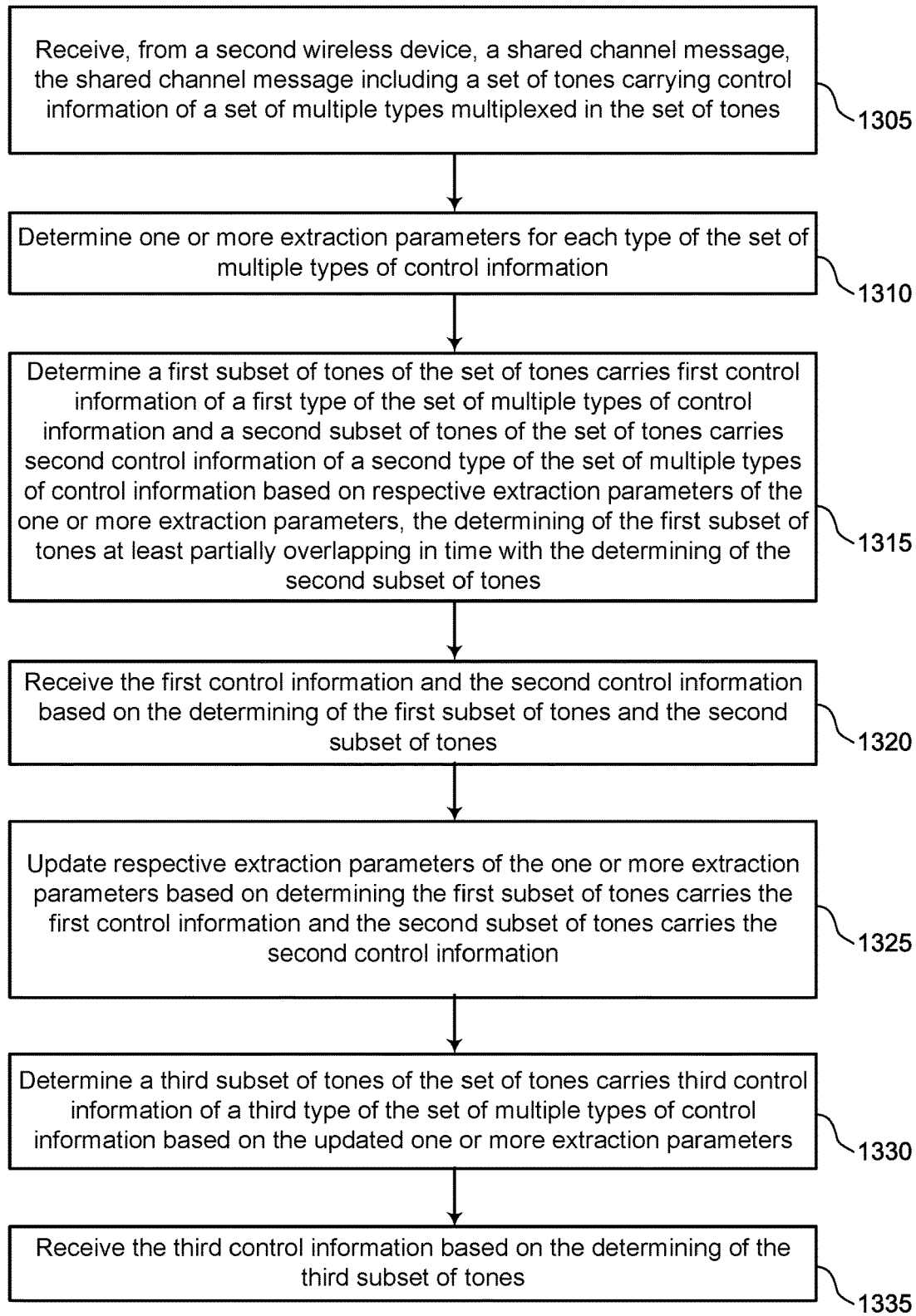

FIG. 13 shows a flowchart illustrating a method that supports tone classification for physical channels with multiplexed data in accordance with aspects of the present disclosure. The operations of the method may be implemented by a UE or its components as described herein. For example, the operations of the method may be performed by a UE 115 or a base station 105 as described with reference to FIGS. 1-11. In some examples, a UE or a base station may execute a set of instructions to control the functional elements of the UE or the base station to perform the described functions. Additionally or alternatively, the UE or the base station may perform aspects of the described functions using special-purpose hardware.

At 1305, the method may include receiving, from a second wireless device, a shared channel message, the shared channel message including a set of tones carrying control information of a set of multiple types multiplexed in the set of tones. The operations of 1305 may be performed in accordance with examples as disclosed herein. In some examples, aspects of the operations of 1305 may be performed by a shared channel message component 925 as described with reference to FIG. 9.

At 1310, the method may include determining one or more extraction parameters for each type of the set of multiple types of control information. The operations of 1310 may be performed in accordance with examples as disclosed herein. In some examples, aspects of the operations of 1310 may be performed by an extraction parameter component 930 as described with reference to FIG. 9.

At 1315, the method may include determining a first subset of tones of the set of tones carries first control information of a first type of the set of multiple types of control information and a second subset of tones of the set of tones carries second control information of a second type of the set of multiple types of control information based on respective extraction parameters of the one or more extraction parameters, the determining of the first subset of tones at least partially overlapping in time with the determining of the second subset of tones. The operations of 1315 may be performed in accordance with examples as disclosed herein. In some examples, aspects of the operations of 1315 may be performed by a tone extraction component 935 as described with reference to FIG. 9.

At 1320, the method may include receiving the first control information and the second control information based on the determining of the first subset of tones and the second subset of tones. The operations of 1320 may be performed in accordance with examples as disclosed herein. In some examples, aspects of the operations of 1320 may be performed by a control information component 940 as described with reference to FIG. 9.

At 1325, the method may include updating respective extraction parameters of the one or more extraction parameters based on determining the first subset of tones carries the first control information and the second subset of tones carries the second control information. The operations of 1325 may be performed in accordance with examples as disclosed herein. In some examples, aspects of the operations of 1325 may be performed by an extraction parameter update component 945 as described with reference to FIG. 9.

At 1330, the method may include determining a third subset of tones of the set of tones carries third control information of a third type of the set of multiple types of control information based on the updated one or more extraction parameters. The operations of 1330 may be performed in accordance with examples as disclosed herein. In some examples, aspects of the operations of 1330 may be performed by an extraction parameter update component 945 as described with reference to FIG. 9.

At 1335, the method may include receiving the third control information based on the determining of the third subset of tones. The operations of 1335 may be performed in accordance with examples as disclosed herein. In some examples, aspects of the operations of 1335 may be performed by an extraction parameter update component 945 as described with reference to FIG. 9.

Figure 14:
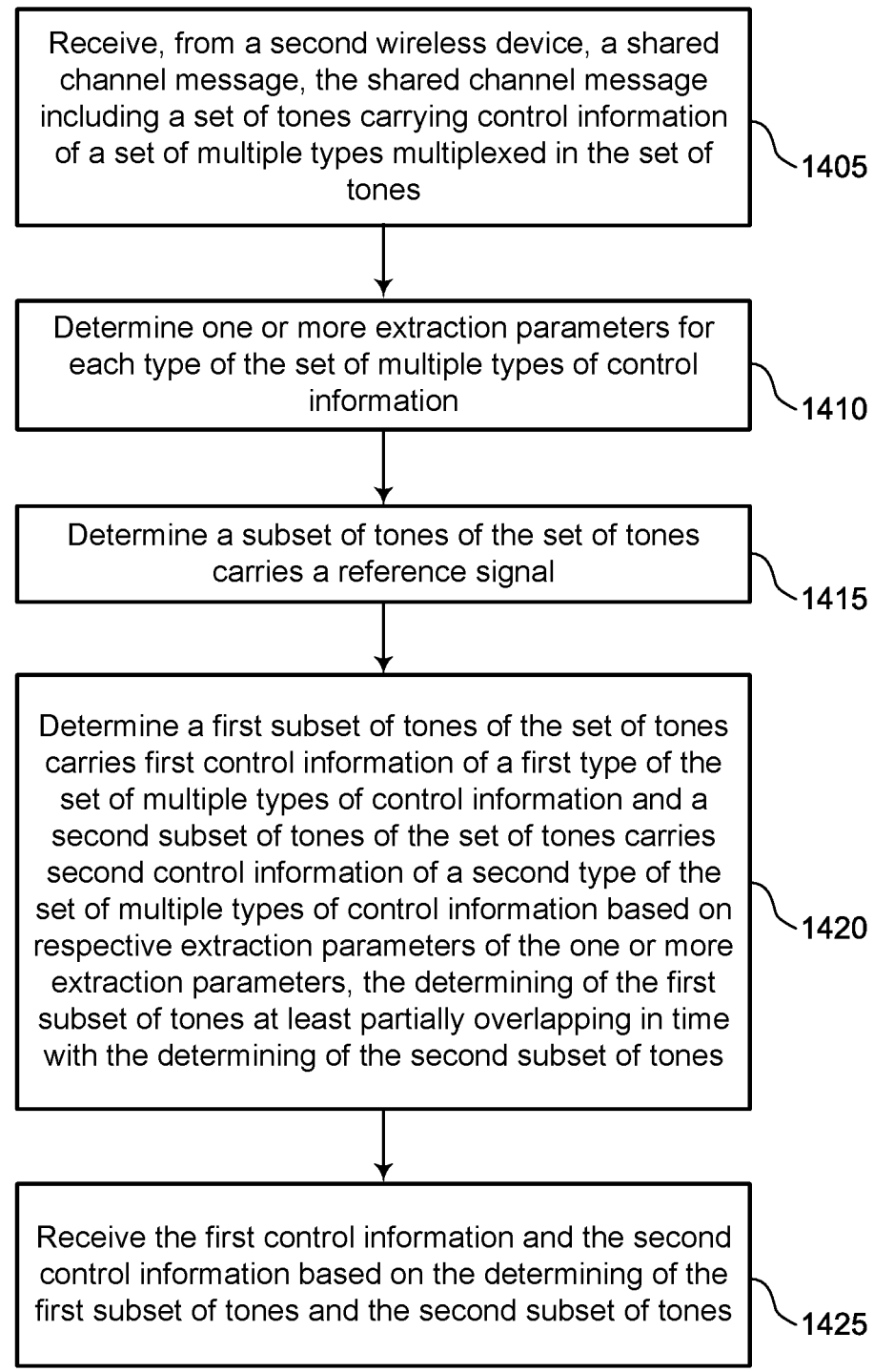

FIG. 14 shows a flowchart illustrating a method that supports tone classification for physical channels with multiplexed data in accordance with aspects of the present disclosure. The operations of the method may be implemented by a UE or its components as described herein. For example, the operations of the method may be performed by a UE 115 or a base station 105 as described with reference to FIGS. 1-11. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include receiving, from a second wireless device, a shared channel message, the shared channel message including a set of tones carrying control information of a set of multiple types multiplexed in the set of tones. The operations of 1405 may be performed in accordance with examples as disclosed herein. In some examples, aspects of the operations of 1405 may be performed by a shared channel message component 925 as described with reference to FIG. 9.

At 1410, the method may include determining one or more extraction parameters for each type of the set of multiple types of control information. The operations of 1410 may be performed in accordance with examples as disclosed herein. In some examples, aspects of the operations of 1410 may be performed by an extraction parameter component 930 as described with reference to FIG. 9.

At 1415, the method may include determining a subset of tones of the set of tones carries a reference signal. The operations of 1415 may be performed in accordance with examples as disclosed herein. In some examples, aspects of the operations of 1415 may be performed by a reference signal component 950 as described with reference to FIG. 9.

At 1420, the method may include determining a first subset of tones of the set of tones carries first control information of a first type of the set of multiple types of control information and a second subset of tones of the set of tones carries second control information of a second type of the set of multiple types of control information based on respective extraction parameters of the one or more extraction parameters, the determining of the first subset of tones at least partially overlapping in time with the determining of the second subset of tones. The operations of 1420 may be performed in accordance with examples as disclosed herein. In some examples, aspects of the operations of 1420 may be performed by a tone extraction component 935 as described with reference to FIG. 9.

At 1425, the method may include receiving the first control information and the second control information based on the determining of the first subset of tones and the second subset of tones. The operations of 1425 may be performed in accordance with examples as disclosed herein. In some examples, aspects of the operations of 1425 may be performed by a control information component 940 as described with reference to FIG. 9.

Figure 15:
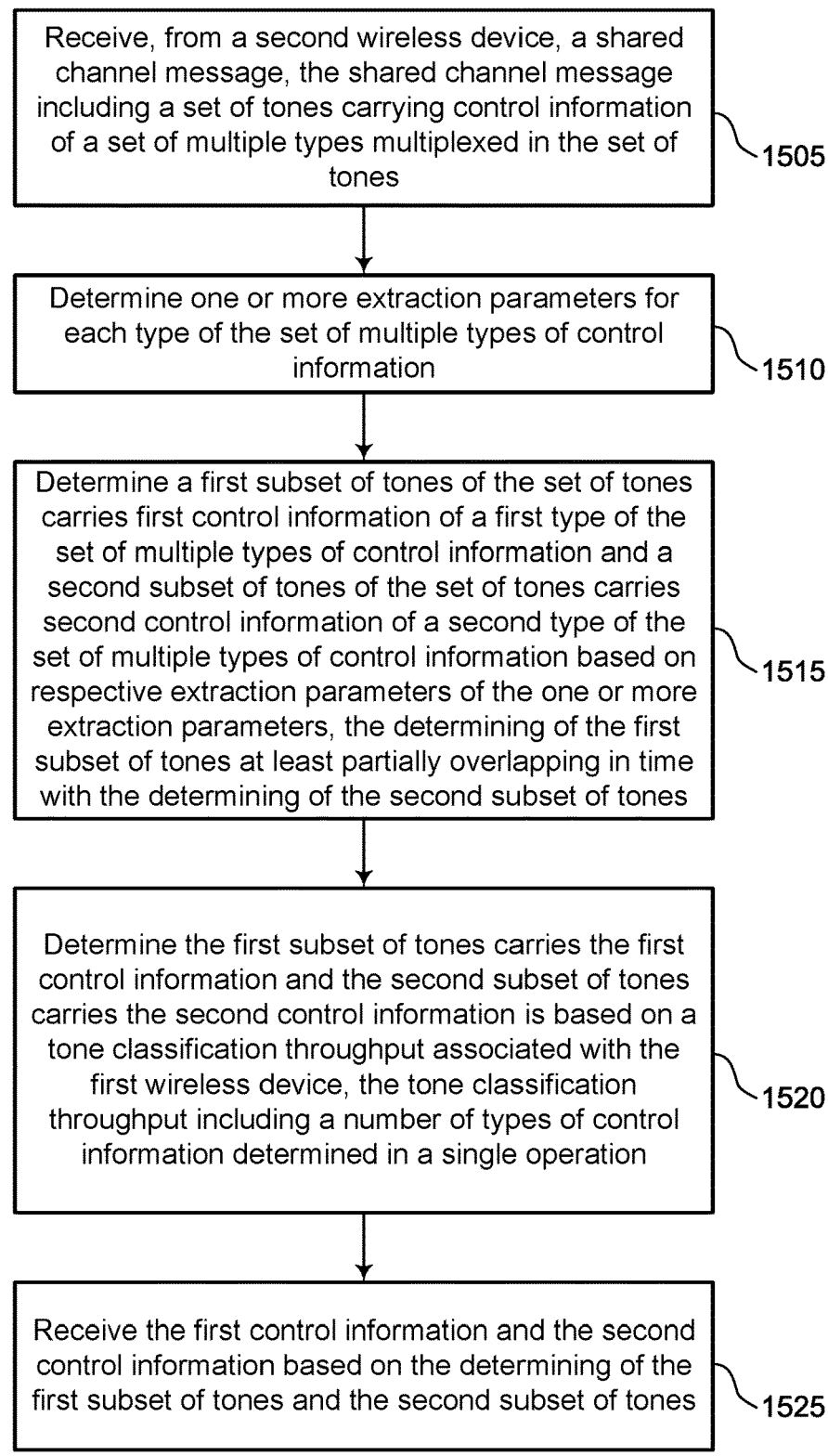

FIG. 15 shows a flowchart illustrating a method that supports tone classification for physical channels with multiplexed data in accordance with aspects of the present disclosure. The operations of the method may be implemented by a UE or its components as described herein. For example, the operations of the method may be performed by a UE 115 or a base station 105 as described with reference to FIGS. 1-11. In some examples, a UE or a base station may execute a set of instructions to control the functional elements of the UE or the base station to perform the described functions. Additionally or alternatively, the UE or the base station may perform aspects of the described functions using special-purpose hardware.

At 1505, the method may include receiving, from a second wireless device, a shared channel message, the shared channel message including a set of tones carrying control information of a set of multiple types multiplexed in the set of tones. The operations of 1505 may be performed in accordance with examples as disclosed herein. In some examples, aspects of the operations of 1505 may be performed by a shared channel message component 925 as described with reference to FIG. 9.

At 1510, the method may include determining one or more extraction parameters for each type of the set of multiple types of control information. The operations of 1510 may be performed in accordance with examples as disclosed herein. In some examples, aspects of the operations of 1510 may be performed by an extraction parameter component 930 as described with reference to FIG. 9.

At 1515, the method may include determining a first subset of tones of the set of tones carries first control information of a first type of the set of multiple types of control information and a second subset of tones of the set of tones carries second control information of a second type of the set of multiple types of control information based on respective extraction parameters of the one or more extraction parameters, the determining of the first subset of tones at least partially overlapping in time with the determining of the second subset of tones. The operations of 1515 may be performed in accordance with examples as disclosed herein. In some examples, aspects of the operations of 1515 may be performed by a tone extraction component 935 as described with reference to FIG. 9.

At 1520, the method may include determining the first subset of tones carries the first control information and the second subset of tones carries the second control information is based on a tone classification throughput associated with the first wireless device, the tone classification throughput including a number of types of control information determined in a single operation. The operations of 1520 may be performed in accordance with examples as disclosed herein. In some examples, aspects of the operations of 1520 may be performed by a tone extraction component 935 as described with reference to FIG. 9.

At 1525, the method may include receiving the first control information and the second control information based on the determining of the first subset of tones and the second subset of tones. The operations of 1525 may be performed in accordance with examples as disclosed herein. In some examples, aspects of the operations of 1525 may be performed by a control information component 940 as described with reference to FIG. 9.

The following provides an overview of aspects of the present disclosure:

Aspect 1: A method for wireless communications at a first wireless device, comprising: receiving, from a second wireless device, a shared channel message, the shared channel message comprising a set of tones carrying control information of a plurality of types multiplexed in the set of tones; determining one or more extraction parameters for each type of the plurality of types of control information; determining a first subset of tones of the set of tones carries first control information of a first type of the plurality of types of control information and a second subset of tones of the set of tones carries second control information of a second type of the plurality of types of control information based at least in part on respective extraction parameters of the one or more extraction parameters, the determining of the first subset of tones at least partially overlapping in time with the determining of the second subset of tones; and receiving the first control information and the second control information based at least in part on the determining of the first subset of tones and the second subset of tones.

Aspect 2: The method of aspect 1, further comprising: updating respective extraction parameters of the one or more extraction parameters based at least in part on determining the first subset of tones carries the first control information and the second subset of tones carries the second control information; determining a third subset of tones of the set of tones carries third control information of a third type of the plurality of types of control information based at least in part on the updated one or more extraction parameters; and receiving the third control information based at least in part on the determining of the third subset of tones.

Aspect 3: The method of aspect 2, wherein a tone allocation for the third control information is based at least in part on a content in one or more of the first control information or the second control information.

Aspect 4: The method of any of aspects 1 through 3, further comprising determining a subset of tones of the set of tones carries a reference signal before determining the first subset of tones carries the first control information and the second subset of tones carries the second control information.

Aspect 5: The method of aspect 4, further comprising determining subsets of tones of the set of tones carry different types of control information of the plurality of types of control information for multiple wireless devices based at least in part on determining the subset of tones carries the reference signal.

Aspect 6: The method of any of aspects 4 through 5, further comprising receiving, from the second wireless device, a reference signal message comprising the reference signal, wherein the reference signal comprises one or more of a phase tracking reference signal or a demodulation reference signal.

Aspect 7: The method of any of aspects 4 through 6, wherein the subset of tones is determined to carry the reference signal for a single user multiple input multiple output configuration.

Aspect 8: The method of any of aspects 1 through 7, further comprising determining the first subset of tones carries the first control information and the second subset of tones carries the second control information is based at least in part on a tone classification throughput associated with the first wireless device, the tone classification throughput comprising a number of types of control information determined in a single operation.

Aspect 9: The method of any of aspects 1 through 8, wherein the one or more extraction parameters comprise one or more of a total number of tones in the set of tones, a distance between each tone in the set of tones, or an offset value.

Aspect 10: The method of any of aspects 1 through 9, wherein the first wireless device comprises a base station, the second wireless device comprises a UE, the shared channel message comprises an uplink shared channel message, and the plurality of types of control information comprises a plurality of types of uplink control information.

Aspect 11: The method of any of aspects 1 through 10, wherein the first wireless device comprises a first UE, the second wireless device comprises a second UE, the shared channel message comprises a sidelink shared channel message, and the plurality of types of control information comprises a plurality of types of sidelink control information.

Aspect 12: The method of any of aspects 1 through 11, wherein a tone allocation for a third control information of a third type of the plurality of types of control information, for scheduled data, or for both is based at least in part on a content of the first control information, the second control information, or both.

Aspect 13: The method of any of aspects 1 through 12, wherein different subsets of tones of the set of tones are determined to carry respective types of control information of the plurality of types of control information based at least in part on a tone classification throughput that is scalable to match a device throughput of the first wireless device, the tone classification throughput comprising a number of types of control information determined in a single operation.

Aspect 14: The method of any of aspects 1 through 13, wherein different subsets of tones of the set of tones are determined to carry respective types of control information of the plurality of types of control information based at least in part on a tone classification throughput that is scalable, the tone classification throughput comprising a number of types of control information determined in a single operation.

Aspect 15: The method of any of aspects 1 through 14, wherein the plurality of the types of control information comprises one or more of reference signals, acknowledgement feedback, channel state information part one, channel state information part two, or scheduled data.

Aspect 16: An apparatus for wireless communications at a first wireless device, comprising a processor; memory coupled with the processor; and instructions stored in the memory and executable by the processor to cause the apparatus to perform a method of any of aspects 1 through 15.

Aspect 17: An apparatus for wireless communications at a first wireless device, comprising at least one means for performing a method of any of aspects 1 through 15.

Aspect 18: A non-transitory computer-readable medium storing code for wireless communications at a first wireless device, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (that is, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
   receiving, from a second wireless device, a shared channel message, the shared channel message comprising a set of tones carrying control information of a plurality of types multiplexed in the set of tones;
   determining one or more extraction parameters for each type of the plurality of types of control information;
   determining a first subset of tones of the set of tones carries first control information of a first type of the plurality of types of control information and a second subset of tones of the set of tones carries second control information of a second type of the plurality of types of control information based at least in part on respective extraction parameters of the one or more extraction parameters, wherein the first subset of tones at least partially overlaps in time with the second subset of tones; and
   receiving the first control information and the second control information based at least in part on the determining of the first subset of tones and the second subset of tones.

2. The method of claim 1, further comprising:
   updating respective extraction parameters of the one or more extraction parameters based at least in part on determining the first subset of tones carries the first control information and the second subset of tones carries the second control information;
   determining a third subset of tones of the set of tones carries third control information of a third type of the plurality of types of control information based at least in part on the updated one or more extraction parameters; and
   receiving the third control information based at least in part on the determining of the third subset of tones.

3. The method of claim 2, wherein a tone allocation for the third control information is based at least in part on a content in one or more of the first control information or the second control information.

4. The method of claim 1, further comprising determining a subset of tones of the set of tones carries a reference signal before determining the first subset of tones carries the first control information and the second subset of tones carries the second control information.

5. The method of claim 4, further comprising determining subsets of tones of the set of tones carry different types of control information of the plurality of types of control information for multiple wireless devices based at least in part on determining the subset of tones carries the reference signal.

6. The method of claim 4, further comprising receiving, from the second wireless device, a reference signal message comprising the reference signal, wherein the reference signal comprises one or more of a phase tracking reference signal or a demodulation reference signal.

7. The method of claim 4, wherein the subset of tones is determined to carry the reference signal for a single user multiple input multiple output configuration.

8. The method of claim 1, further comprising determining the first subset of tones carries the first control information and the second subset of tones carries the second control information is based at least in part on a tone classification throughput associated with the first wireless device, the tone classification throughput comprising a number of types of control information determined in a single operation.

9. The method of claim 1, wherein the one or more extraction parameters comprise one or more of a total number of tones in the set of tones, a distance between each tone in the set of tones, or an offset value.

10. The method of claim 1, wherein the first wireless device comprises a base station, the second wireless device comprises a user equipment (UE), the shared channel message comprises an uplink shared channel message, and the plurality of types of control information comprises a plurality of types of uplink control information.

11. The method of claim 1, wherein the first wireless device comprises a first user equipment (UE), the second wireless device comprises a second UE, the shared channel message comprises a sidelink shared channel message, and the plurality of types of control information comprises a plurality of types of sidelink control information.

12. The method of claim 1, wherein a tone allocation for a third control information of a third type of the plurality of types of control information, for scheduled data, or for both is based at least in part on a content of the first control information, the second control information, or both.

13. The method of claim 1, wherein different subsets of tones of the set of tones are determined to carry respective types of control information of the plurality of types of control information based at least in part on a tone classification throughput that is scalable to match a device throughput of the first wireless device, the tone classification throughput comprising a number of types of control information determined in a single operation.

14. The method of claim 1, wherein different subsets of tones of the set of tones are determined to carry respective types of control information of the plurality of types of control information based at least in part on a tone classification throughput that is scalable, the tone classification throughput comprising a number of types of control information determined in a single operation.

15. The method of claim 1, wherein the plurality of the types of control information comprises one or more of reference signals, acknowledgement feedback, channel state information part one, channel state information part two, or scheduled data.

16. An apparatus for wireless communications at a first wireless device, comprising:
  a processor;
  memory coupled with the processor; and
  instructions stored in the memory and executable by the processor to cause the apparatus to:
    receive, from a second wireless device, a shared channel message, the shared channel message comprising a set of tones carrying control information of a plurality of types multiplexed in the set of tones;
    determine one or more extraction parameters for each type of the plurality of types of control information;
    determine a first subset of tones of the set of tones carries first control information of a first type of the plurality of types of control information and a second subset of tones of the set of tones carries second control information of a second type of the plurality of types of control information based at least in part on respective extraction parameters of the one or more extraction parameters, wherein the first subset of tones at least partially overlaps in time with the second subset of tones; and
    receive the first control information and the second control information based at least in part on the determining of the first subset of tones and the second subset of tones.

17. The apparatus of claim 16, wherein the instructions are further executable by the processor to cause the apparatus to:
  update respective extraction parameters of the one or more extraction parameters based at least in part on determining the first subset of tones carries the first control information and the second subset of tones carries the second control information;
  determine a third subset of tones of the set of tones carries third control information of a third type of the plurality of types of control information based at least in part on the updated one or more extraction parameters; and
  receive the third control information based at least in part on the determining of the third subset of tones.

18. The apparatus of claim 17, wherein a tone allocation for the third control information is based at least in part on a content in one or more of the first control information or the second control information.

19. The apparatus of claim 16, wherein the instructions are further executable by the processor to cause the apparatus to determine that a subset of tones of the set of tones carries a reference signal before determining the first subset of tones carries the first control information and the second subset of tones carries the second control information, or
  wherein the instructions are further executable by the processor to cause the apparatus to determine that subsets of tones of the set of tones carry different types of control information of the plurality of types of control information for multiple wireless devices based at least in part on determining the subset of tones carries the reference signal.

20. The apparatus of claim 19, wherein the instructions are further executable by the processor to cause the apparatus to receive, from the second wireless device, a reference signal message comprising the reference signal, wherein the reference signal comprises one or more of a phase tracking reference signal or a demodulation reference signal.

21. The apparatus of claim 19, wherein the subset of tones is determined to carry the reference signal for a single user multiple input multiple output configuration.

22. The apparatus of claim 16, wherein the instructions are further executable by the processor to cause the apparatus to determine the first subset of tones carries the first control information and the second subset of tones carries the second control information is based at least in part on a tone classification throughput associated with the first wireless device, the tone classification throughput comprising a number of types of control information determined in a single operation.

23. The apparatus of claim 16, wherein the one or more extraction parameters comprise one or more of a total number of tones in the set of tones, a distance between each tone in the set of tones, or an offset value.

24. The apparatus of claim 16, wherein the first wireless device comprises a base station, the second wireless device comprises a user equipment (UE), the shared channel message comprises an uplink shared channel message, and the plurality of types of control information comprises a plurality of types of uplink control information.

25. The apparatus of claim 16, wherein the first wireless device comprises a first user equipment (UE), the second wireless device comprises a second UE, the shared channel message comprises a sidelink shared channel message, and the plurality of types of control information comprises a plurality of types of sidelink control information.

26. The apparatus of claim 16, wherein a tone allocation for a third control information of a third type of the plurality of types of control information, for scheduled data, or for both is based at least in part on a content of the first control information, the second control information, or both.

27. The apparatus of claim 16, wherein different subsets of tones of the set of tones are determined to carry respective types of control information of the plurality of types of control information based at least in part on a tone classification throughput that is scalable to match a device throughput of the first wireless device, the tone classification throughput comprising a number of types of control information determined in a single operation, or
  wherein different subsets of tones of the set of tones are determined to carry respective types of control information of the plurality of types of control information based at least in part on a tone classification throughput that is scalable, the tone classification throughput comprising a number of types of control information determined in a single operation.

28. The apparatus of claim 16, wherein the plurality of the types of control information comprises one or more of reference signals, acknowledgement feedback, channel state information part one, channel state information part two, or scheduled data.

29. An apparatus for wireless communications at a first wireless device, comprising:
  means for receiving, from a second wireless device, a shared channel message, the shared channel message comprising a set of tones carrying control information of a plurality of types multiplexed in the set of tones;

means for determining one or more extraction parameters for each type of the plurality of types of control information;
means for determining a first subset of tones of the set of tones carries first control information of a first type of the plurality of types of control information and a second subset of tones of the set of tones carries second control information of a second type of the plurality of types of control information based at least in part on respective extraction parameters of the one or more extraction parameters, wherein the first subset of tones at least partially overlaps in time with the second subset of tones; and
means for receiving the first control information and the second control information based at least in part on the determining of the first subset of tones and the second subset of tones.

30. A non-transitory computer-readable medium storing code for wireless communications at a first wireless device, the code comprising instructions executable by a processor to:

receive, from a second wireless device, a shared channel message, the shared channel message comprising a set of tones carrying control information of a plurality of types multiplexed in the set of tones;
determine one or more extraction parameters for each type of the plurality of types of control information;
determine a first subset of tones of the set of tones carries first control information of a first type of the plurality of types of control information and a second subset of tones of the set of tones carries second control information of a second type of the plurality of types of control information based at least in part on respective extraction parameters of the one or more extraction parameters, wherein the first subset of tones at least partially overlaps in time with the second subset of tones; and
receive the first control information and the second control information based at least in part on the determining of the first subset of tones and the second subset of tones.

* * * * *